US011074555B2

(12) United States Patent
Shah et al.

(10) Patent No.: US 11,074,555 B2
(45) Date of Patent: Jul. 27, 2021

(54) SYSTEMS AND METHODS FOR IMPLEMENTING STRUCTURED ASYNCHRONOUS AND SYNCHRONOUS GROUP INTERACTION WITH AUTOMATIC ASSISTANCE OVER USER SELECTED MEDIA

(71) Applicants: Ajit S. Shah, Portola Valley, CA (US); Kalpak Shah, Portola Valley, CA (US); Laura Vernon-Elliott, Portola Valley, CA (US); Mychalleah Werner, Portola Valley, CA (US)

(72) Inventors: Ajit S. Shah, Portola Valley, CA (US); Kalpak Shah, Portola Valley, CA (US); Laura Vernon-Elliott, Portola Valley, CA (US); Mychalleah Werner, Portola Valley, CA (US)

( * ) Notice: Subject to any disclaimer, the term of this patent is extended or adjusted under 35 U.S.C. 154(b) by 682 days.

(21) Appl. No.: 15/334,205

(22) Filed: Oct. 25, 2016

(65) Prior Publication Data

US 2017/0116581 A1    Apr. 27, 2017

Related U.S. Application Data

(60) Provisional application No. 62/246,518, filed on Oct. 26, 2015.

(51) Int. Cl.
*G06Q 10/10*   (2012.01)
(52) U.S. Cl.
CPC ................. *G06Q 10/1097* (2013.01)
(58) Field of Classification Search
None
See application file for complete search history.

(56) References Cited

U.S. PATENT DOCUMENTS

| 2011/0029622 A1* | 2/2011 | Walker ................. G06Q 10/107 709/206 |
| 2015/0356430 A1* | 12/2015 | Saxena .................... G06N 5/04 706/12 |
| 2016/0350721 A1* | 12/2016 | Comerford ........ G06Q 10/1095 |

FOREIGN PATENT DOCUMENTS

WO    WO-2017040167 A1 *  3/2017  ............. G06Q 50/01

OTHER PUBLICATIONS

D. Perera, J. Kay, I. Koprinska, K. Yacef and O. R. Zaïane, "Clustering and Sequential Pattern Mining of Online Collaborative Learning Data," in IEEE Transactions on Knowledge and Data Engineering, vol. 21, No. 6, pp. 759-772, Jun. 2009, doi: 10.1109/TKDE.2008.138. (Year: 2009).*

* cited by examiner

*Primary Examiner* — Matthew S Gart
*Assistant Examiner* — Tiera J Fletcher
(74) *Attorney, Agent, or Firm* — Kang S. Lim

(57) ABSTRACT

An event orchestrator that enables one or more users to simply and efficiently plan, create and execute a group event through automated and intelligent group interaction where a group interaction is one or more action between two or more members of the group including making a decision, sharing information, developing a plan, sharing state information, providing assistance via reminders, coordinating logistics, confirming a task, approving an action, etc. The group orchestration engine enables one or more users to use intelligence to manage and automate communication workflow between all of the participants to ensure that each is aware of their individual responsibilities, the timing and location of the event/task, the status of each task and status of each individual (location, completion of responsibilities, timely reminders to those involved, etc.). The system provides both open and closed loop management of each task and provides for state based automated reminders to individual participants.

27 Claims, 25 Drawing Sheets

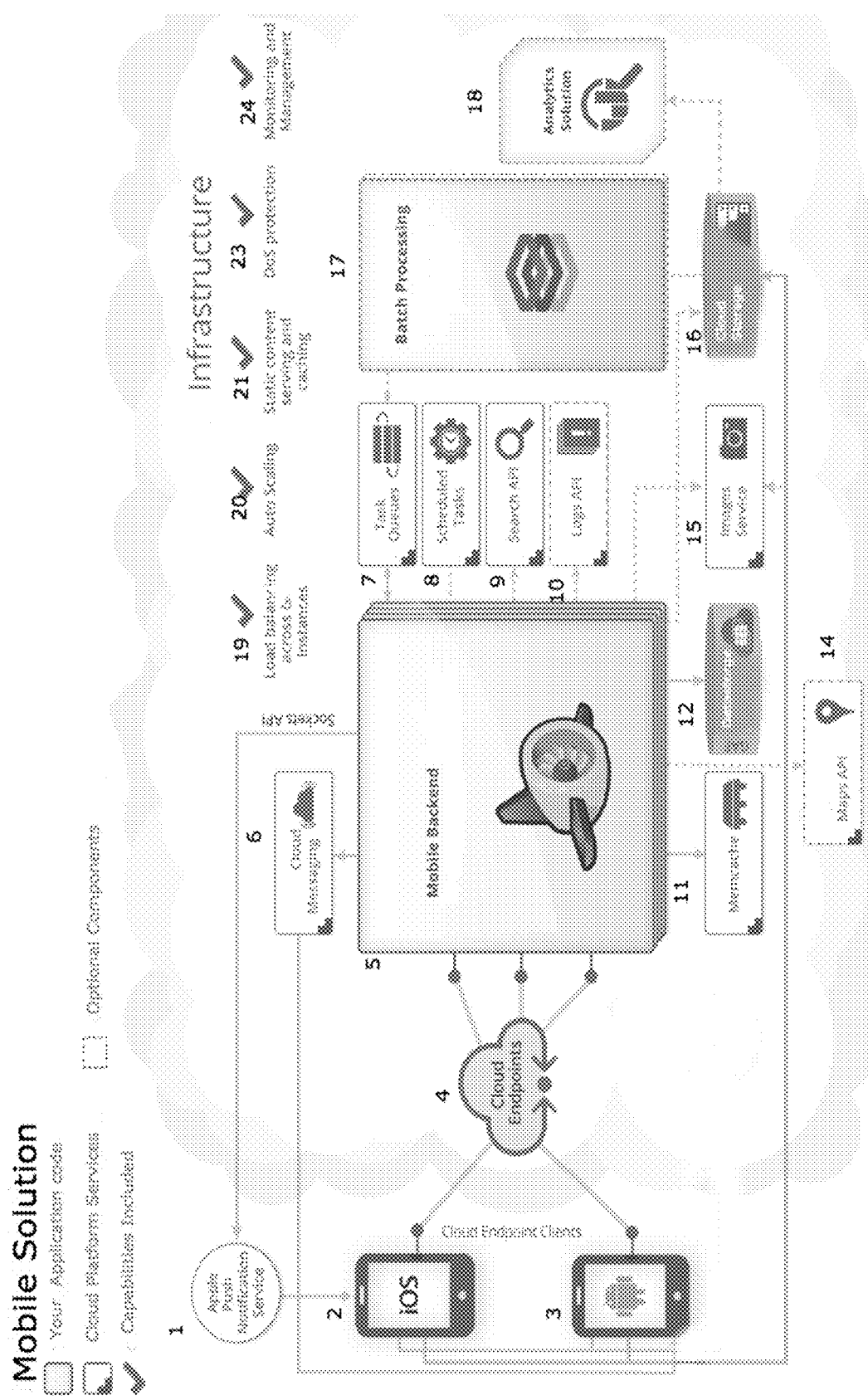

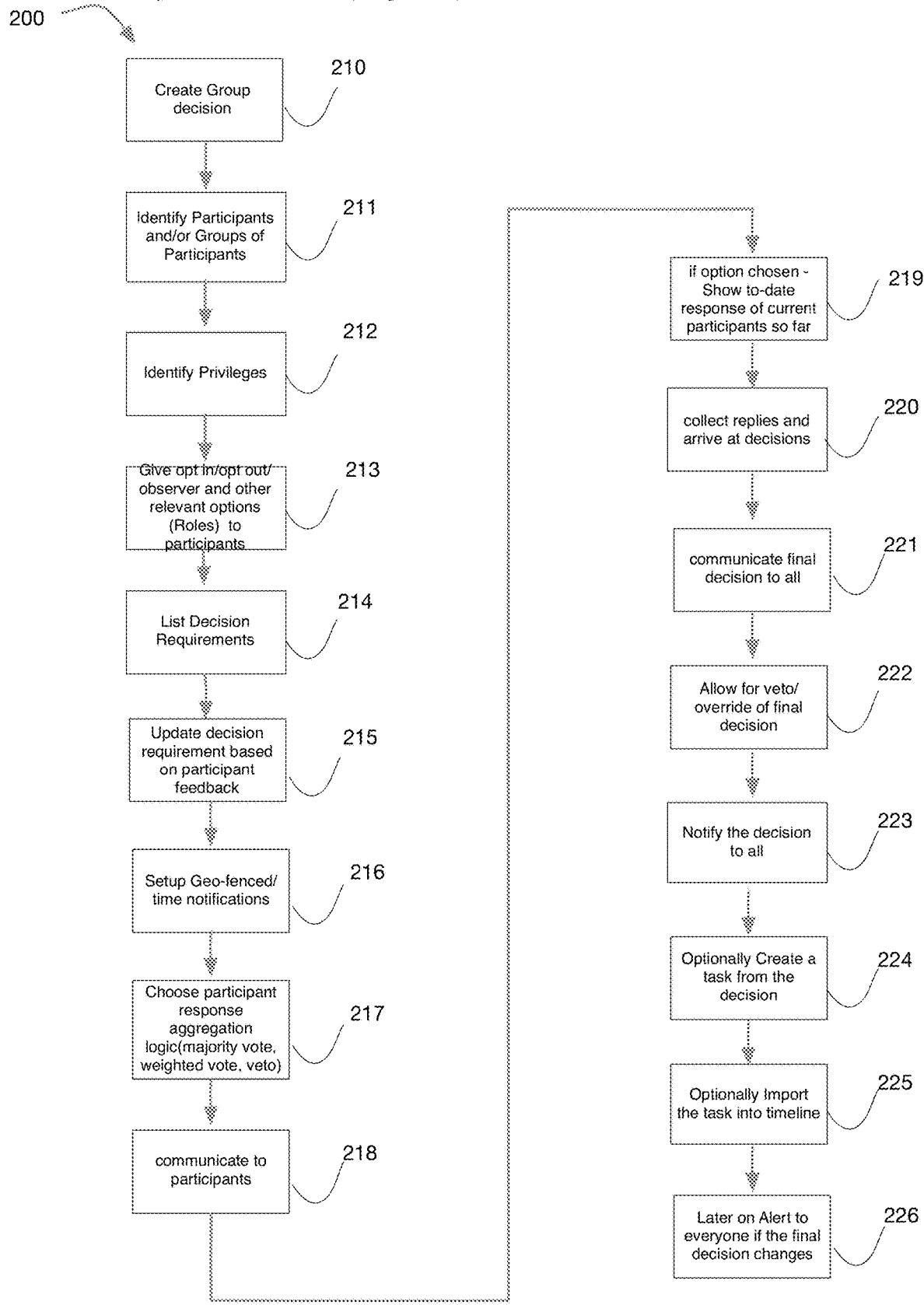

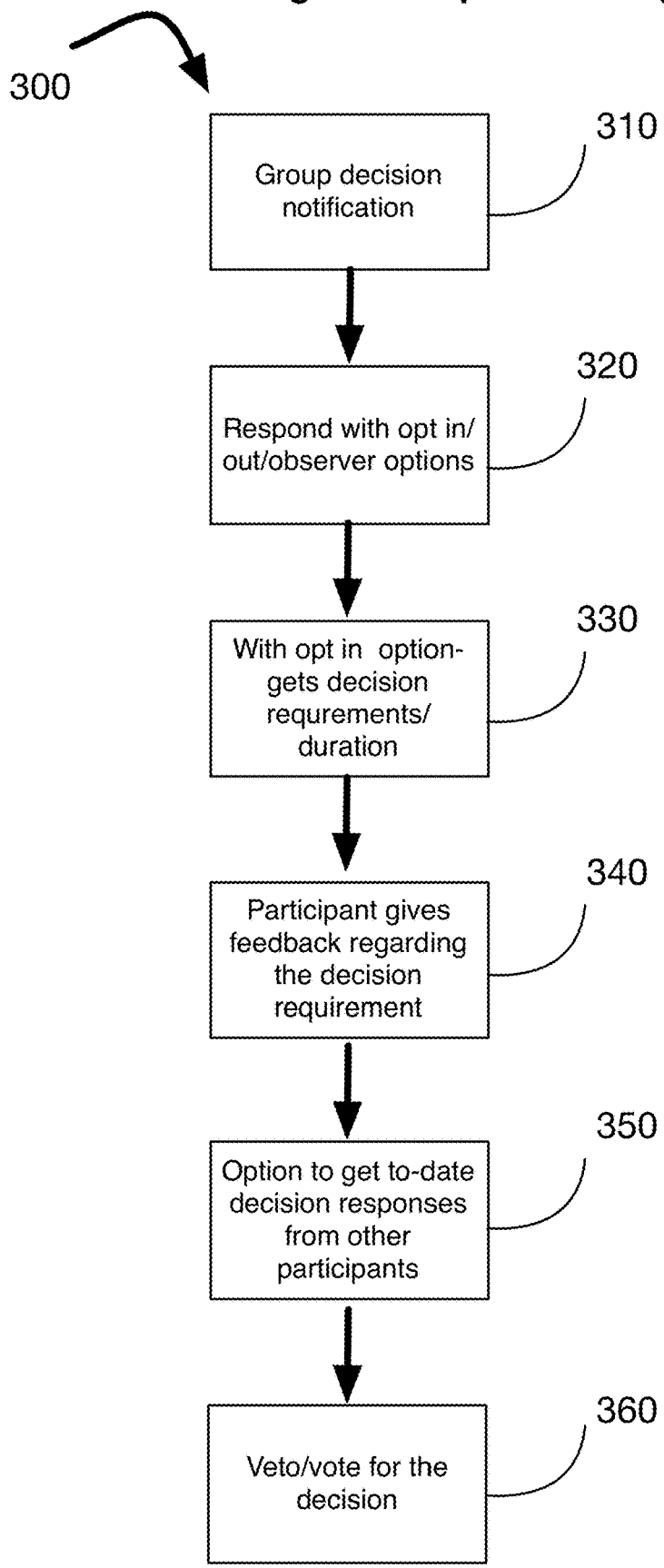
Fig: 3 Group Decision (Participant)

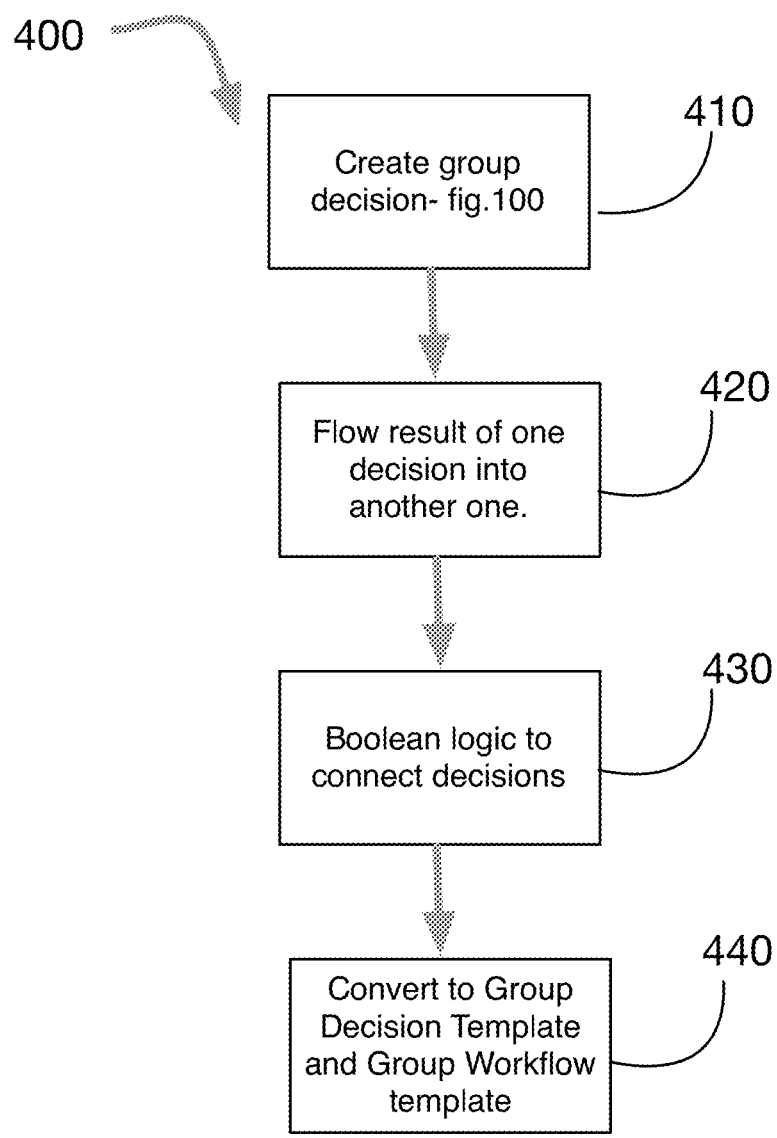

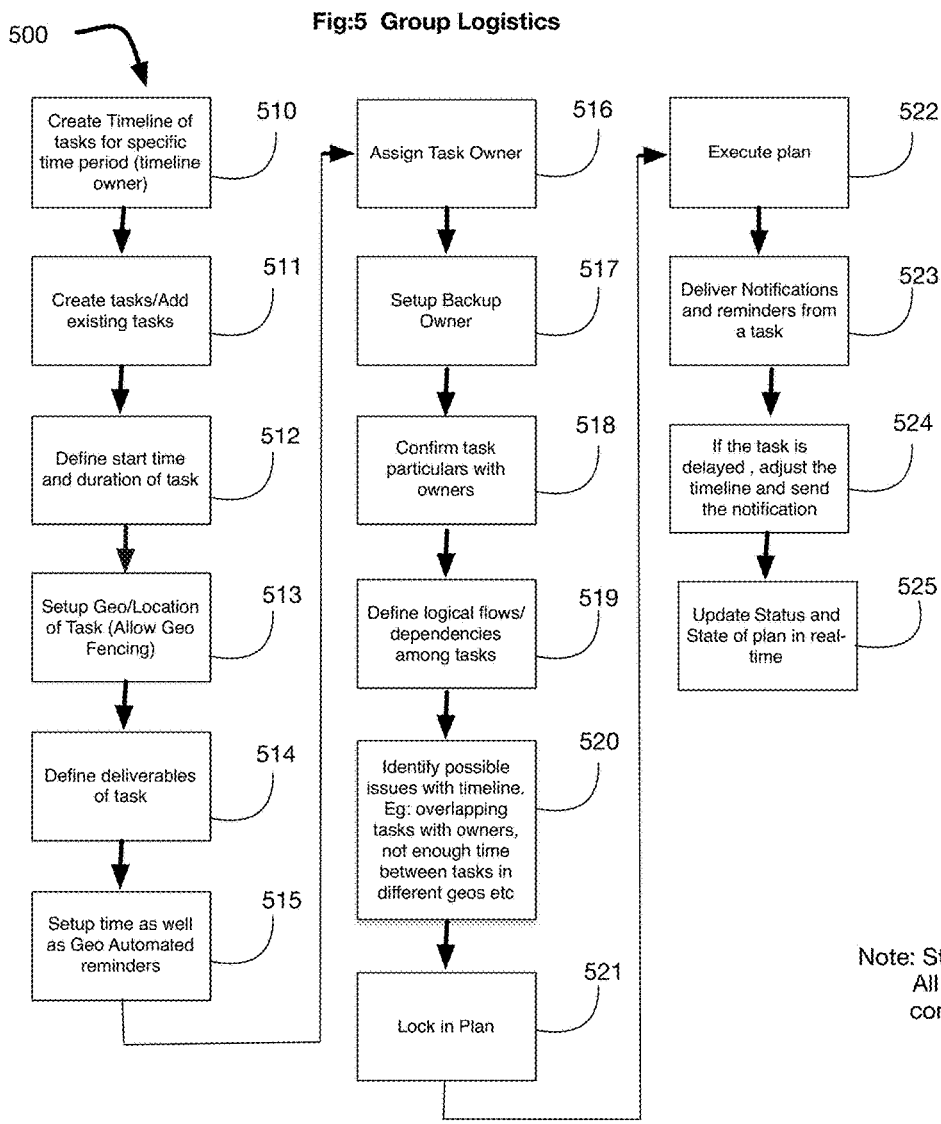

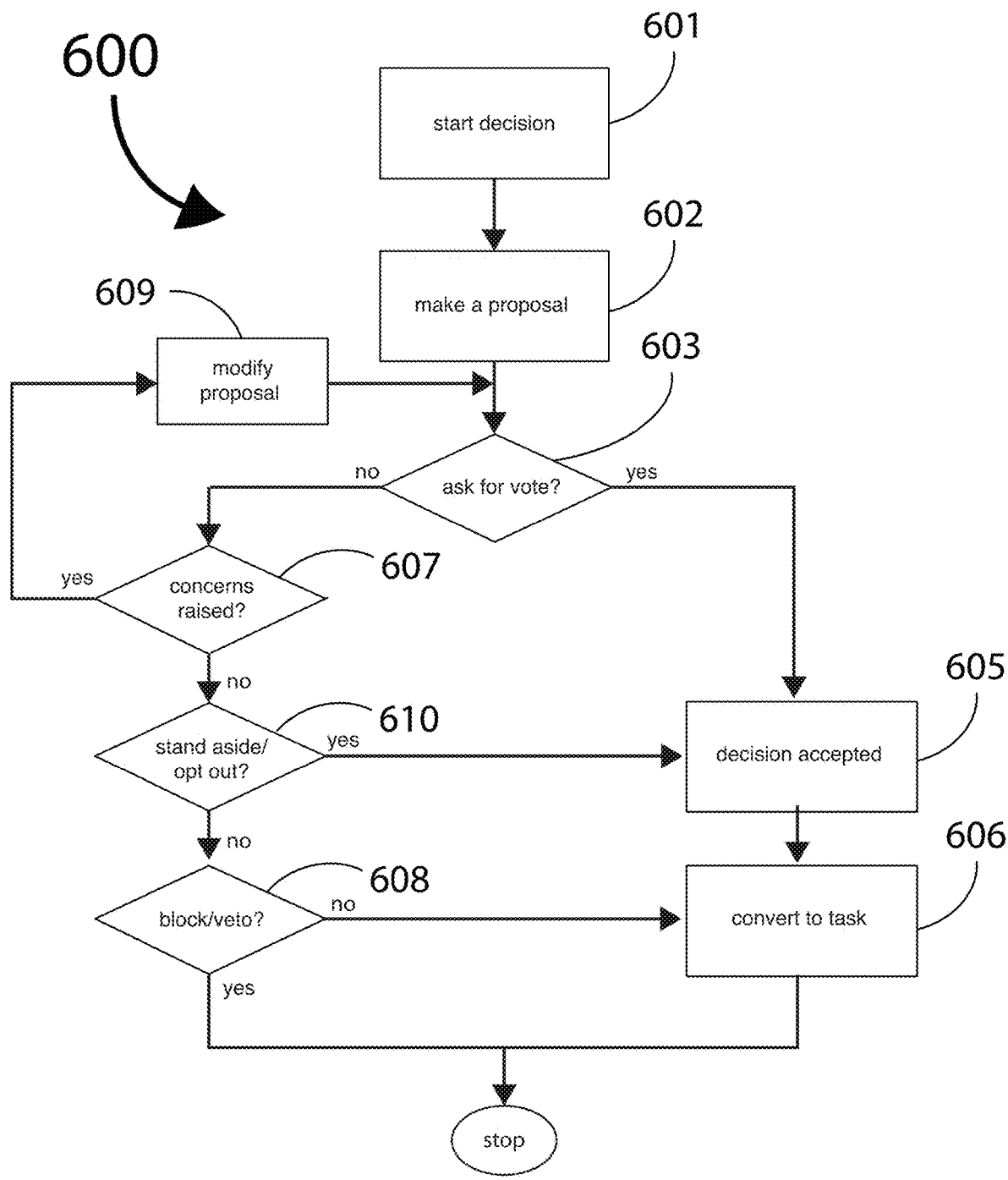
FIG. 6  Group Decision Workflow

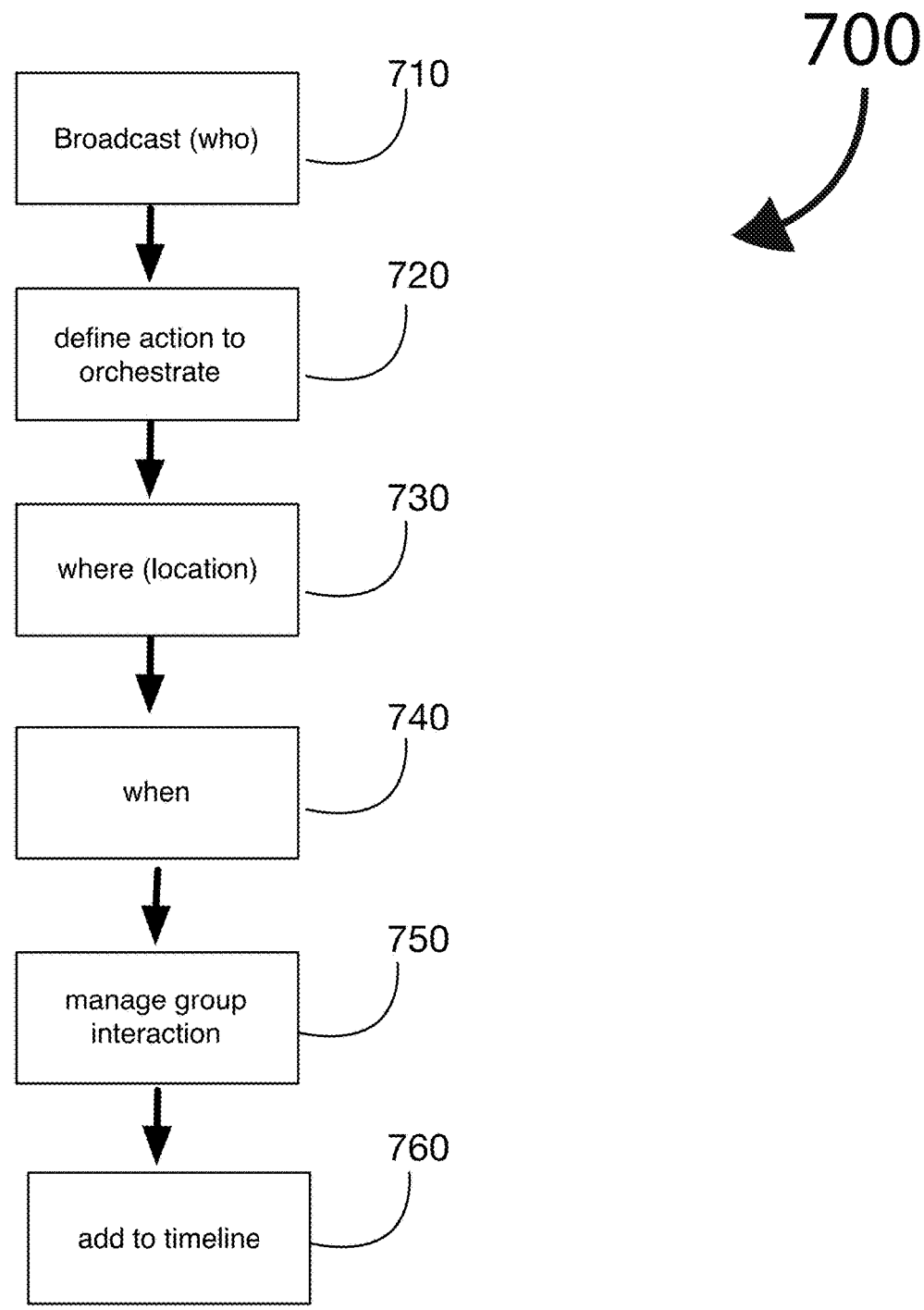
FIG. 7  Group Orchestration Setup

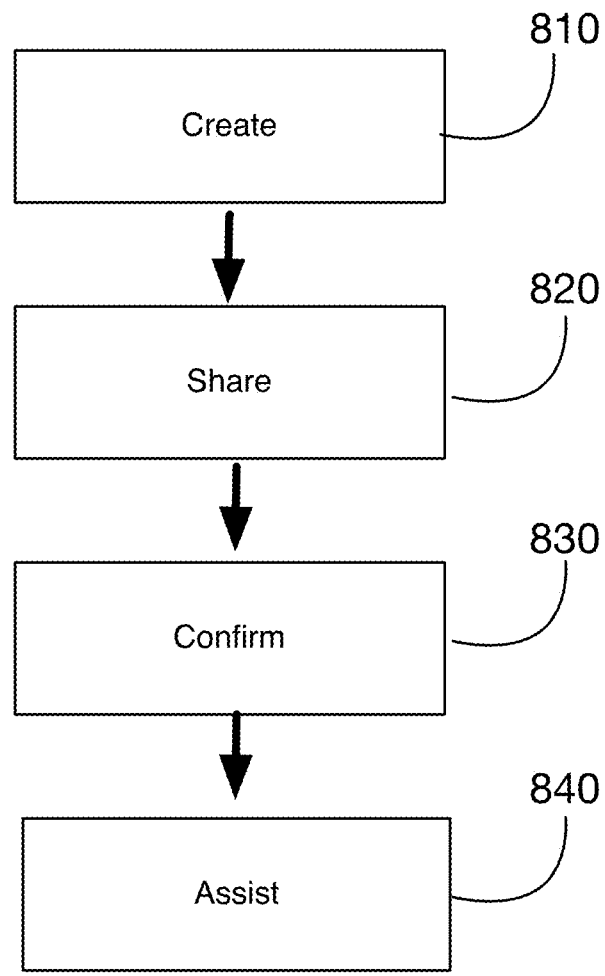
FIG. 8     Group Orchestration Engine Module(s)

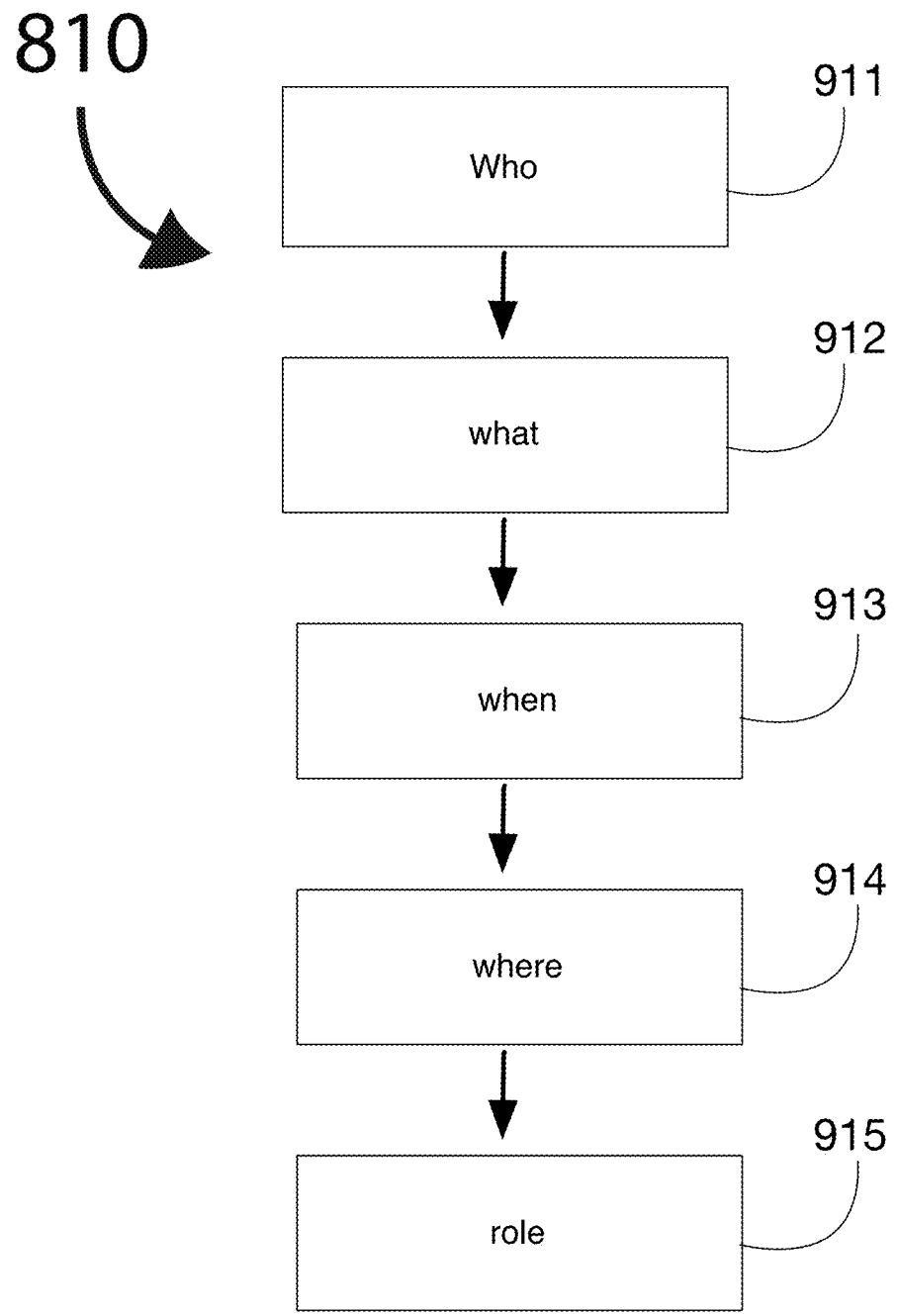
FIG. 9  Create Module(s)

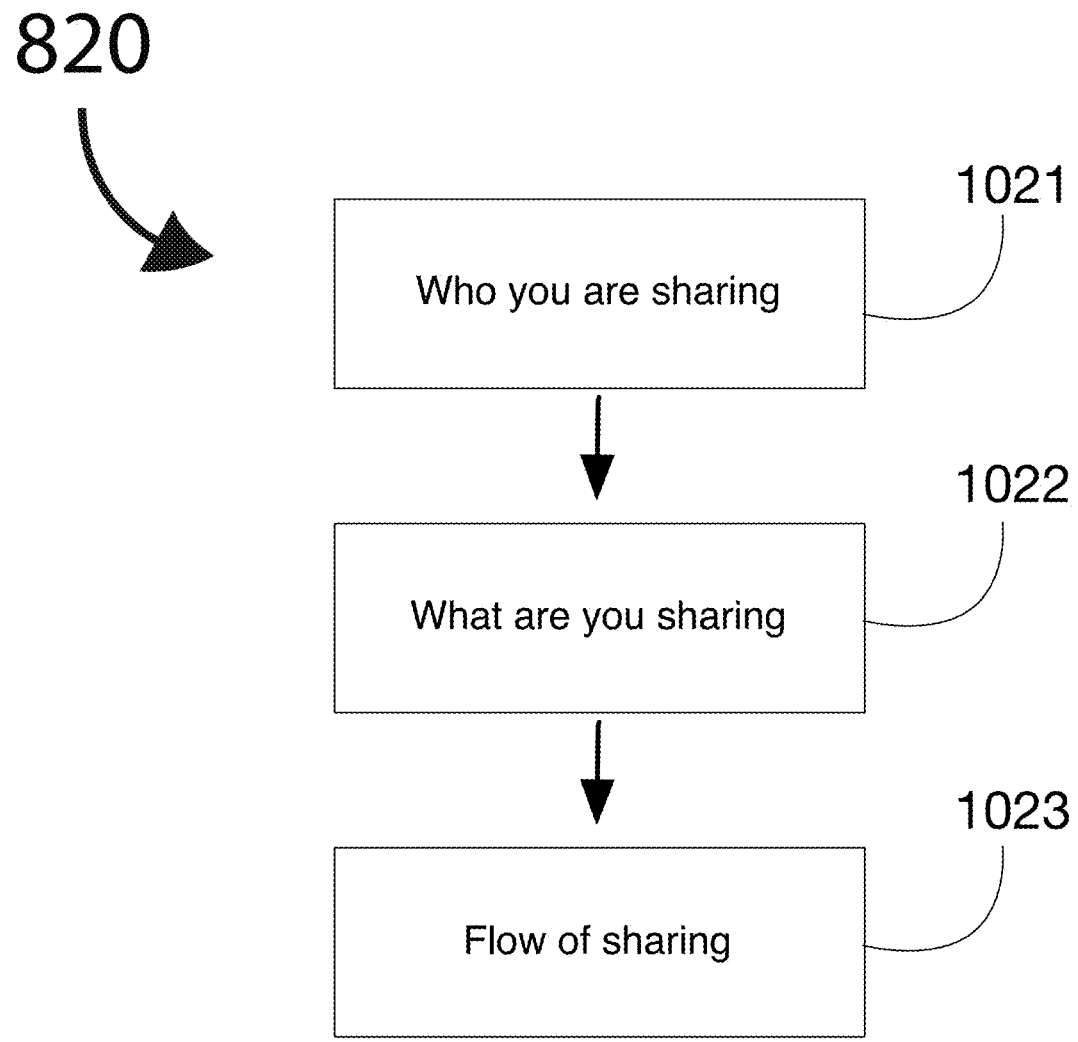
FIG. 10  Share Module(s)

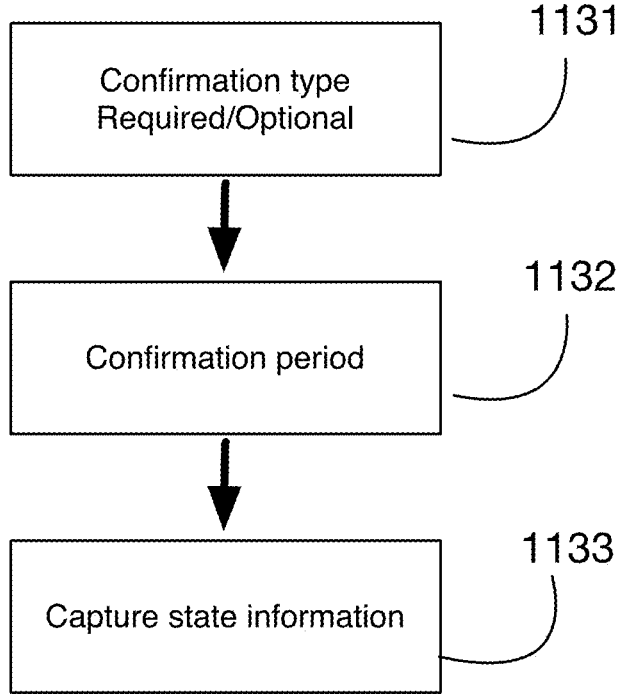
FIG. 11  Confirm Module(s)

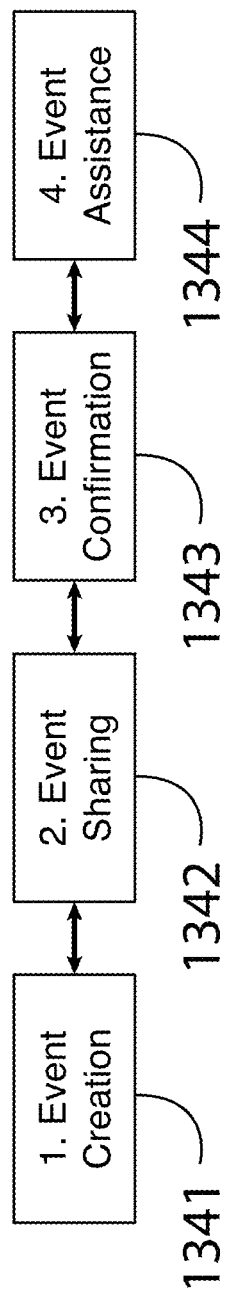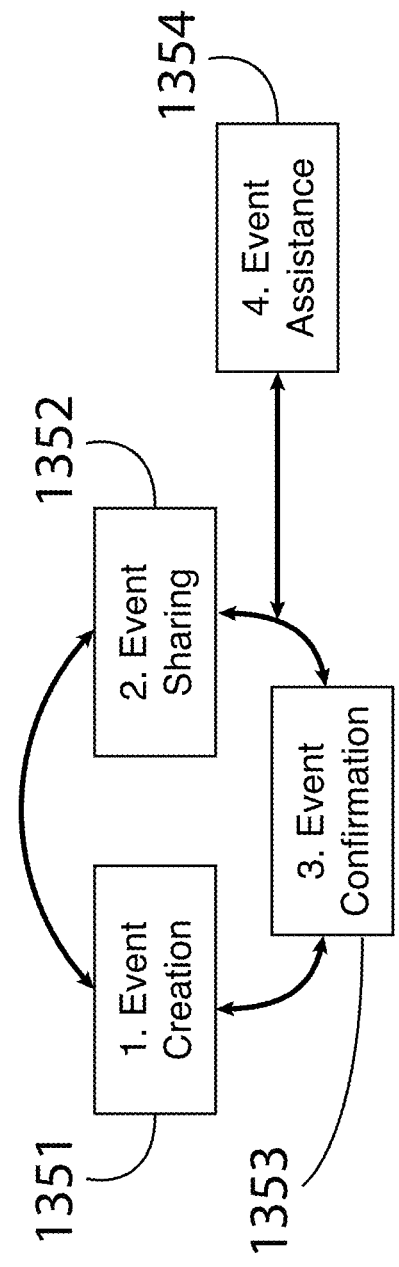
FIG. 13B
FIG. 13C

Event Timeline

FIG. 15B  Nested Travel Schedule

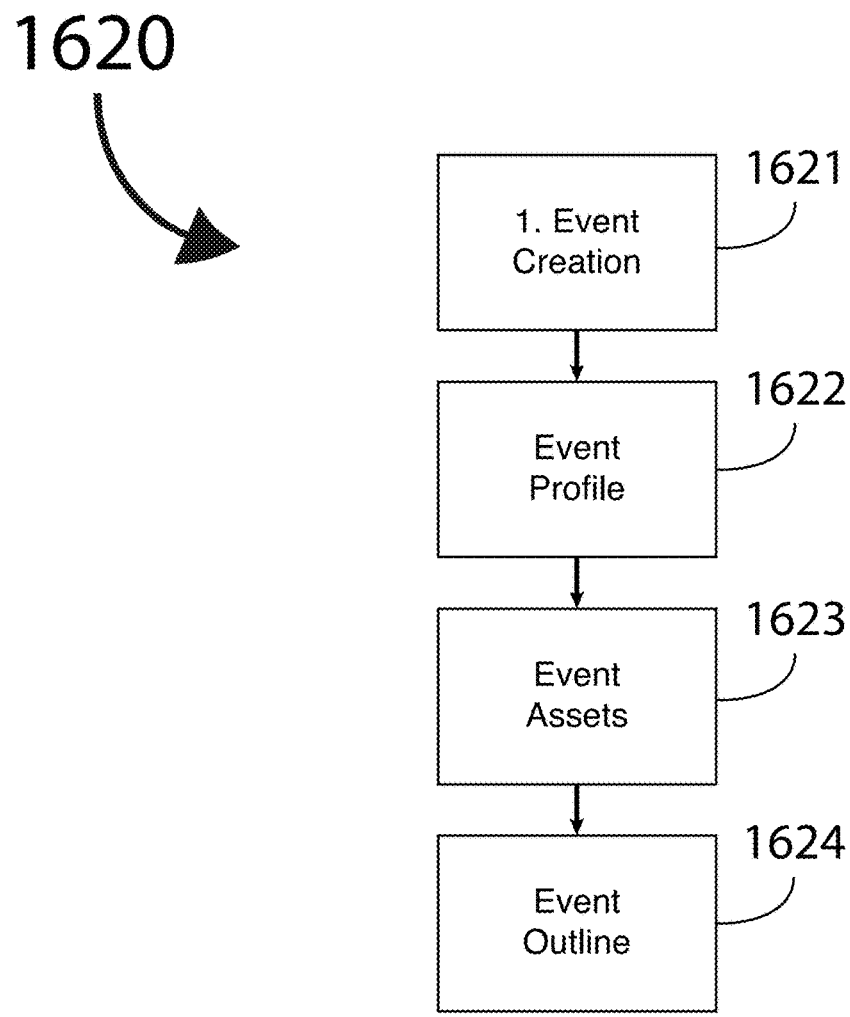
FIG. 16B    Event Creation - Subcategories

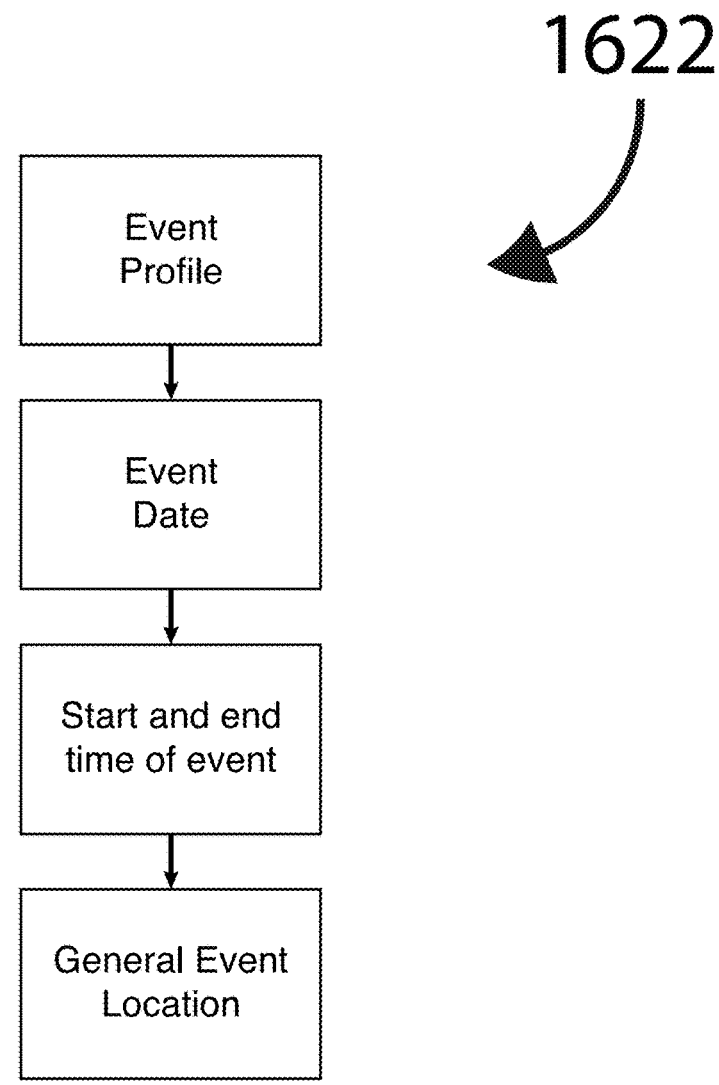
FIG. 16C          Event Profile

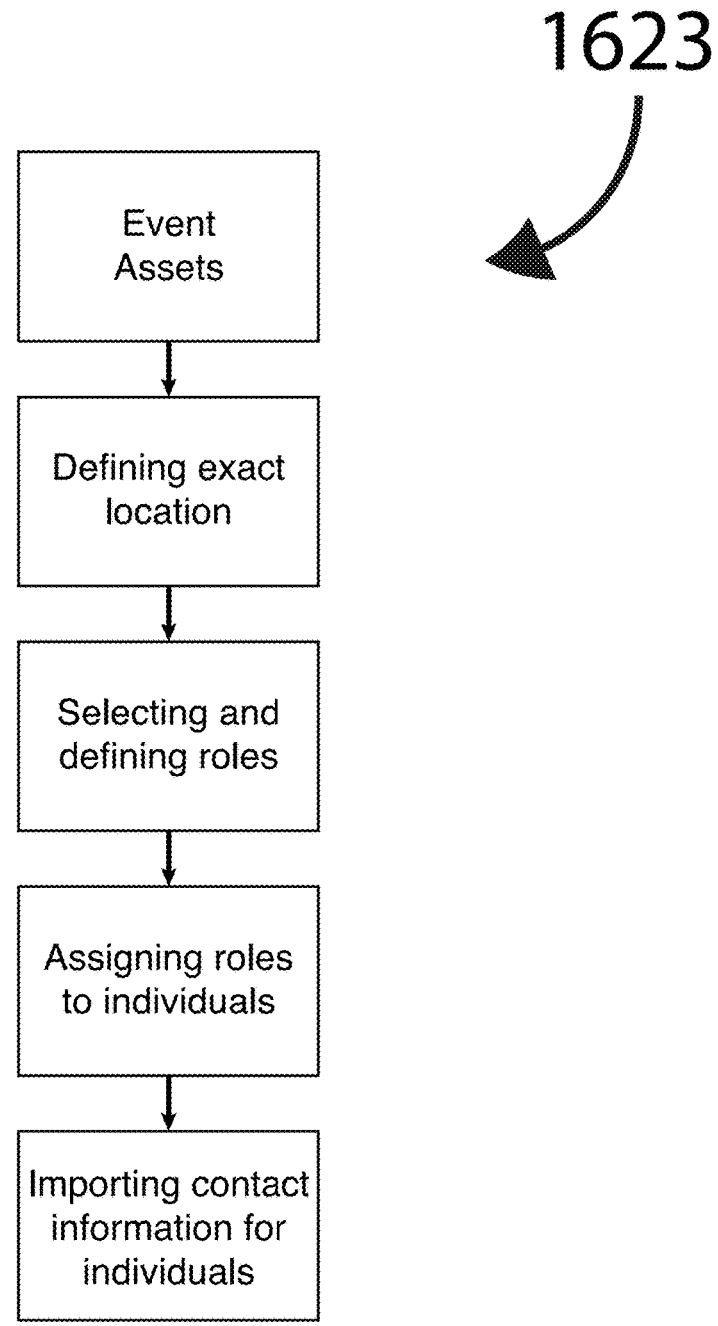
FIG. 16D  Event Assets

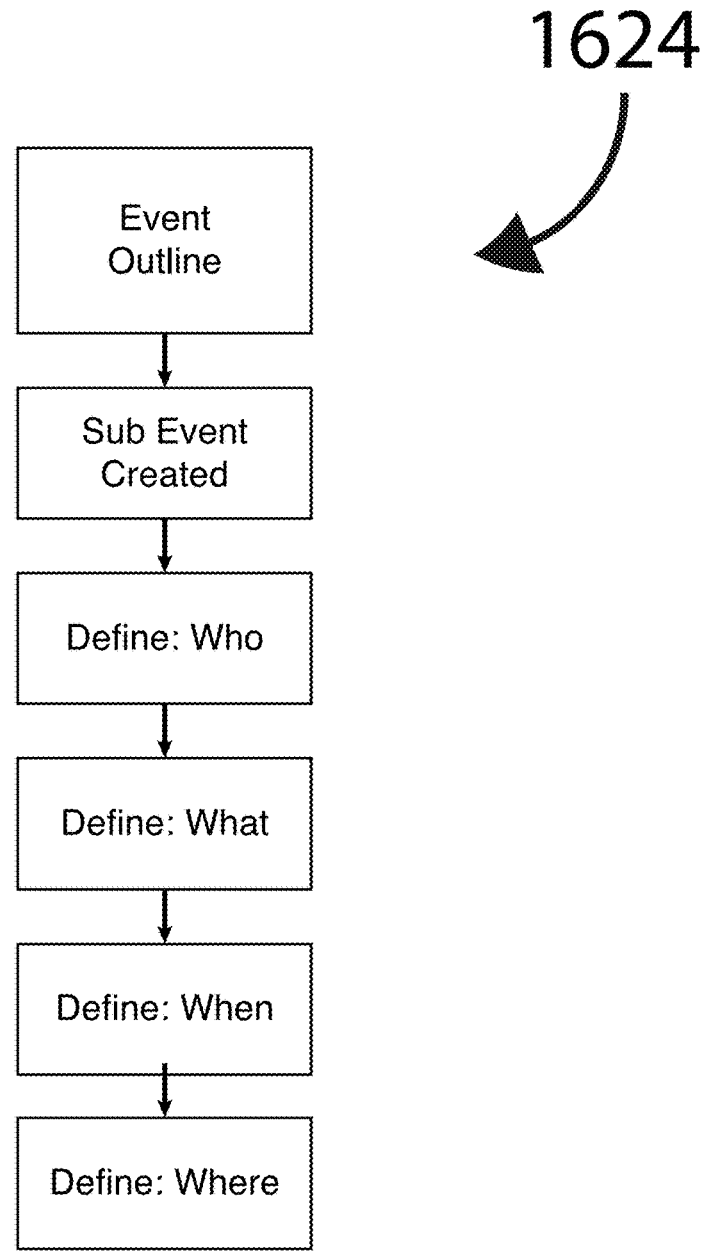
FIG. 16E        Event Outline - Sub Event

SYSTEMS AND METHODS FOR IMPLEMENTING STRUCTURED ASYNCHRONOUS AND SYNCHRONOUS GROUP INTERACTION WITH AUTOMATIC ASSISTANCE OVER USER SELECTED MEDIA

CROSS REFERENCE TO RELATED APPLICATIONS

This non-provisional application claims priority of Provisional U.S. Application Ser. No. 62/246,518 filed on Oct. 26, 2015, entitled "Systems and Methods for Implementing Structure Asynchronous Group Interaction w/Automatic Reminders over user Selected Media", which is hereby fully incorporated by reference.

BACKGROUND

The present invention relates to systems and methods for orchestrating events with multiple participants assigned with a variety of corresponding tasks on an event timeline.

When a group of people (where a group is defined as more than 1 person) are trying to coordinate the orchestration of an event (where an event can range from something simple such as a group lunch to a complex event such as a wedding comprised of many tasks and many people), it is critical to have communication between the involved parties. Ideally, the people involved would be able to interact in real-time as needed to ensure that the event is proceeding according to plan. The interaction would typically include making sure that all parties are aware of their responsibilities, the timing and location of the event/task and the status of each task and individual (location, completion of responsibilities, timely reminders to those involved, etc.).

Currently, people rely on a range of methods (including voice calls, emails, text messages) to communicate event plans and coordinate the activity of the people involved in the orchestration of an event. These platforms are most effective for 1-1 communication. They lose effectiveness as the number of people involved increases, and as the complexity and number of tasks/events increase. Today's communication platforms are also not automated, as they require a person to initiate and follow up on the communication. Today, there is typically one individual who serves as a primary coordinator and takes responsibility for defining the event and its component tasks, coordinating the decision making process, communicating the decisions that have been made, communicating specific responsibilities to each involved party, checking status of each task, reminding each individual as needed and communicating/relaying the status of each task to those that need to know. Even with the use of mobile devices, email, text, calendars and voice calls, the interaction between the individuals responsible for orchestrating the event is a manual process which requires one or more people to manually manage all the different aspects of task execution.

Group interaction (a group being defined as more than one person) is where a collection of people are involved in orchestrating an event, where the event is comprised of one or more tasks where such tasks include but are not limited to making a decision, sharing information, developing a plan, sharing state information, providing assistance via reminders, coordinating logistics and/or approving an action.

Group interactions are currently either asynchronous or synchronous. Asynchronous group interaction is when individual members of the group (or subsets of the group) interact with each other with or without the participation of some sub-set of the group members in a non-real time manner. Information is transferred between the participants using different means such as voice, email and/or text, etc. Often asynchronous group interaction will utilize a hub and spoke model where the hub is an individual who serves as the organizer of the group and is responsible for coordinating the group interaction. Asynchronous group interaction is advantageous because it enables each member of the group to participate in the task on their own timeline and does not require real-time responses. The challenge with asynchronous group interaction is that attributes available with real-time synchronous interaction (such as the context of an interaction, the emotion associated with each participants perspective and the ability to share new ideas and data that would influence the decision) is often lost. To capture context and to enable each member of the group to share new information, many group interactions are carried out using synchronous methods such as in-person meetings and/or conference calls (voice and video conferencing). By definition, synchronous interaction requires coordinating a common time (and/or location) for the interaction to occur and can be limited by the availability of one or more group members. In addition, in synchronous group interaction a dominant participant in the group can limit the interaction and contribution of other members, and there is limited ability to create sidebar conversations that may require the participation of a sub-set of the group.

It is therefore apparent that an urgent need exists for a flexible event orchestrator capable of managing an event with a plurality of participants assigned with a plurality of tasks that may or may not have dependencies.

SUMMARY

In one embodiment, the group orchestration engine includes a platform which is simple to use but powerful in its ability to support large numbers of tasks and users. Its simplicity makes it valuable for amateur planners planning a weekend getaway and its scalability makes it powerful enough for professional planners who are coordinating a decision and/or planning a large event such as a wedding, corporate offsite or conference. Exemplary features, e.g., attributes, of the embodiment are described below:
- Orchestrate the planning and execution of an event (where an event can be any activity including a wedding, decision or plan) comprised of two or more people and one or more tasks
- Coordinate the interaction between the participants in an intelligent and automated manner
- Create a task and/or share a task and/or confirm a task and/or assist in the execution of a task
- Where a task can include one or more of the following attributes:
    - Can be created by any of the participants (distributed model)
    - Creation can be restricted to a subset of the participants (hub and spoke)
    - Each participant in the task can be assigned a role
    - Creator of the task can define who is involved in the task and/or where the task is located and/or what is the task and/or the time of the task
    - Rewards for different actions/state (gamification)
    - The task contains both unstructured data (voice and text) and meta data The task contains structured data
Supports synchronous interaction between the participants
Supports asynchronous interaction between the participants
Ability to define group type for each participant (planner, inner circle, vendor, guest) which can be used by participants when creating a task
Ability to define rights and privileges for a participant or group of participants
Ability to set dependencies between one or more tasks
Participants can communicate emotion via graphical or other means
Created by using pre-defined templates to create a task or event
Dependencies between tasks can be defined by participants
Tasks can be assigned to one or more groups
Groups of tasks can be associated with one or more parameters (location, participant, etc.)

Where sharing of one or more tasks between participants can include one or more of the following attributes:
Sharing is enabled between all or a subset of the participants
Order of sharing of a task can be defined by one or more of the participants using a Boolean logic construct or other order definable by one or more of the participants
Sharing is limited to the originator of the task
Rewards can be defined for participation (gamification) and response to sharing
Sharing of the task involves both unstructured communication means (voice and text) and meta data
Sharing of the task involves structured communication means
Sharing is performed by synchronous interaction between the participants
Sharing is performed by asynchronous interaction between the participants
Ability to define sharing by group type which can be used by participants when sharing a task
Ability to define rights and privileges for a participant or group of participants which can be used to define whom and how tasks are shared
Ability to define dependencies between one or more tasks which can be used to define whom and how tasks are shared Where confirmation of the task and/or one of the parameters defining the tasks by one or more of the participants can include one or more of the following attributes:
Confirmation is required by one or more of the the participants (closed-loop)
Order of confirmation is defined by one or more of the participants using a Boolean logic construct or other order definable by one or more of the participants
Confirmation is not required for any of the participants
Participants can communicate emotion in response to a request for confirmation for a task and/or a parameter in the task
Rewards for participants (gamification) for confirmation based on one or more parameters such as quickest to confirm
Confirmation of the task involves unstructured communication means (voice and text) and associated meta data is captured
Confirmation of the task involves structured communication means
Confirmation of the task is performed by synchronous interaction between the participants
Confirmation of the task is performed by asynchronous interaction between the participants
Ability to define confirmation by group type which can be used by participants to define how a task is to be confirmed
Ability to define rights and privileges for a participant or group of participants which can be used to define whom and how tasks are confirmed
Ability to define dependencies between one or more tasks which can be used to define whom and how tasks are confirmed Where execution of the task can include one or more of the following attributes (Note that each of the following attributes can be designated to be performed automatically and intelligently or at the request of a participant):
Automatically and intelligently coordinate the interaction between the participants
Automatically and intelligently deliver reminders to the participants of the event
Automatically capture and provide status information to one or more participants
Provide each participant with customized information for the event
Access public databases and push relevant information customized for each participant to each participant in the form of alerts and reminders using a range of communication means (voice, email, text, etc.)
Provide automated updates and reminders based on state information such as location, time, status to one or more of the group members where such information is automatically provided by the users device (such as GPS on mobile phone) or manually entered by a participant in response to a request by the event orchestration platform or originated by the participant
Automate workflow based on logical constructs, state information of a task and dependencies defined by a participant
Provide customized views of the database which are designed to display one or more attributes of one or more tasks in a graphical way customized for each participant
Use machine learning to inform the communication to each participant
Provide state information of one or more parameters of a task or tasks to each participant or subset of participants synchronously in real time
Simultaneously share location of each participant across one or more tasks and display in a graphical way (such as icons on a map)
Simultaneously share time to arrival (ETA) for each participant to the location of a task/event based on current location and mode of transportation and determination of travel time using public traffic databases and public weather databases and display in a graphical way (such as icons on a map)
Simultaneously display completion status of one or more tasks based on response to an automated query of one or more participants in each task to evaluate state Automatically communicate one or more tasks and/or elements of the task to one or more participants using one or more communication modalities such as text, email or voice Automatically broadcast updates to a task including status and changes Automatically replace a task with another task (backup plan i.e. Plan B) based on one or more criteria defined by one or more participants such as task completion status or weather or traffic Provide real time status information for more than two parties where status is location, completion state, contact information, etc.

Simultaneously communicate one or parameters of one or more tasks comprising an event with one or more participants Note that the group orchestration engine enables one or more users to simply and efficiently plan, create and execute a group event through automated and intelligent group interaction. A group event can be a combination of one or more tasks (items such as reception, dinner, transportation) and/or one or more actions (such as decision making, planning, sharing information, etc.). A group interaction can also be one or more actions between two or more members of the group including making a decision, sharing information, developing a plan, sharing state information, providing assistance via reminders, coordinating logistics, confirming a task, approving an action, etc. The group orchestration platform contemplated in this specification utilizes intelligence and automation to enable a new model for orchestration of a group event. Note that the group orchestration engine contemplates that an event can be defined to be any activity that requires group interaction. The event can be a decision, a plan, a wedding or any other activity. Group interaction (a group being defined as more than one person) is where a collection of people are involved in orchestrating an event, where the event is comprised of one or more tasks where such tasks include but are not limited to making a decision, sharing information, developing a plan, sharing state information, providing assistance via reminders, coordinating logistics and/or approving an action. When a group of people (where a group is defined as more than 1 person) are trying to coordinate the orchestration of an event (where an event can range from something simple such as a group lunch to a complex event such as a wedding comprised of many tasks and many people), the group orchestration engine enables participants to define and automate communication and information workflows between the involved parties. The people involved in the event are able to interact in real-time or non-real-time as needed to ensure that the event is proceeding according to plan. The interaction enabled by the group orchestration engine includes making sure that all parties are aware of their responsibilities, the timing and location of the event/task and the status of each task and individual (location, completion of responsibilities, timely reminders to those involved, etc.).

In addition, the various event orchestration features of the present invention described herein may be practiced alone or in combination. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 provides an overview of one embodiment of an event orchestration system and interaction between each of the sub-components, in accordance with the present invention;

FIGS. 2-11 are exemplary flow diagrams illustrating the operation of the event orchestration system of FIG. 1;

FIGS. 13A-13E illustrate exemplary event workflows for the event orchestration system of FIG. 1;

Figure 15B:
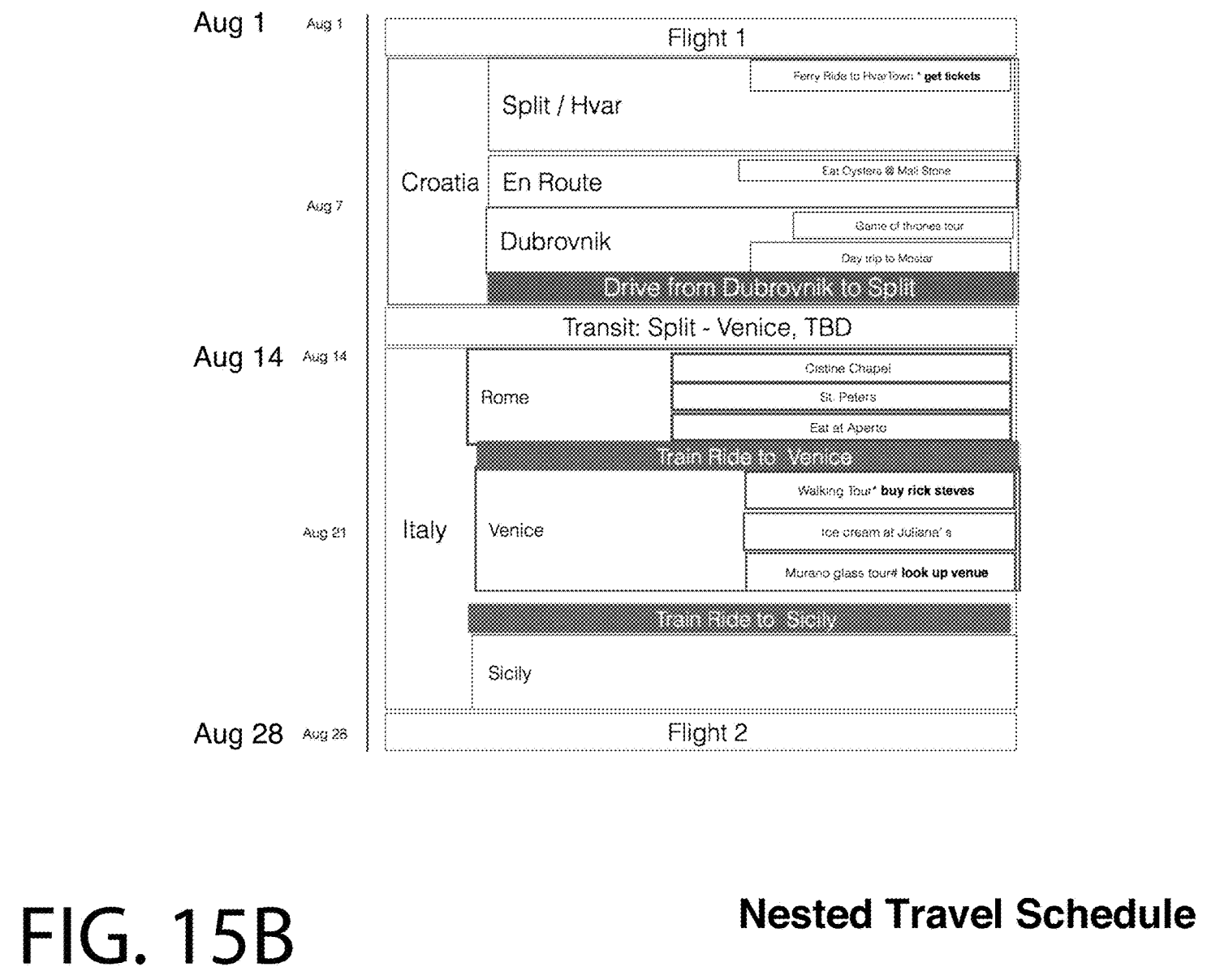

FIGS. 13F, 14, 15A, 15B and 16A are exemplary screenshots illustrating the operation of the event orchestration system of FIG. 1; and FIGS. 16B-16E further illustrate exemplary event workflows for the event orchestration system of FIG. 1.

In the drawings, like reference numerals are sometimes used to designate like structural elements. It should also be appreciated that the depictions in the figures are diagrammatic and not to scale.

DETAILED DESCRIPTION

Figure 12:
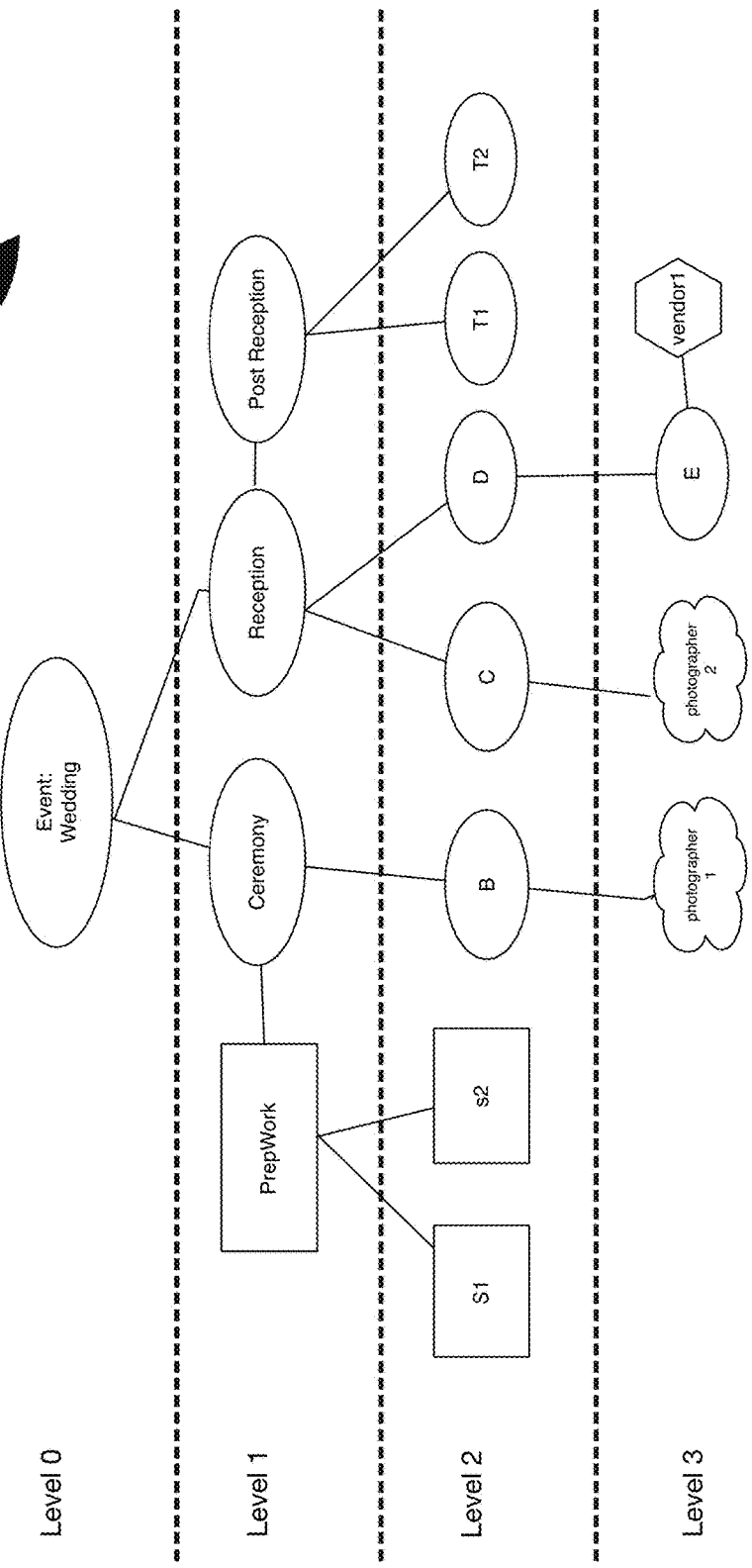
FIG. 12 illustrates exemplary multi-level tasks for the event orchestration system of FIG. 1.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. In addition, various features of the present invention can be practiced alone or in combination. These features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

I. System Architecture and Overview

In one embodiment as shown FIG. 1, an exemplary event orchestrator capable of group interaction that would combines the benefits of asynchronous interaction and synchronous interaction is an event orchestration system (FIG. 1) that enables thereby enabling both synchronous and asynchronous interaction in both a structured and unstructured manner. Such a dual (asynchronous/synchronous) group interaction model that captures structured and unstructured data input from individual participants, stores the information in a database and intelligently shares the information with other participants in a structured manner enables automated and efficient group interaction and can facilitate the orchestration of an event including one or more tasks such as making a decision, sharing information, developing a plan, coordinating logistics and/or approving an action.

To further enable the interaction to be effective, the asynchronous (and/or synchronous) structured group interaction platform would include a wide variety of tools that would enable each participant to provide both structured interaction (using structured data or other means) around a range of variables common to most tasks such as participants (who), definition of activity/event (what), location (where), time (when), money (cost), emotion, as well as provide the ability to provide unstructured interaction in traditional methods including voice and text. The event orchestration platform would enable and intelligently automate and coordinate a wide range of group orchestration activities including group planning, group decision and group execution.

Referring now to FIG. 2, for example, if a group was formed to make a decision on a proposed venue for an event, in the new asynchronous structured platform model, an originator of the decision would create a task (Select a Venue) for group decision (Step 210 of FIG. 2), define the participants in the group (Step 211 of FIG. 2), identify any privileges for any participants (Step 212 of FIG. 2), define parameters of the decision (Step 213 of FIG. 2), identify requirements for the decision and provide any background information on the task (location, cost, capacity, availability, etc.) (Step 214 of FIG. 2), setup location based or time based restrictions for decision (Step 216 of FIG. 2), choose type of logic for aggregating participant response (Step 217 of FIG. 2), share decision task with participants (Step 218 of FIG. 2), provide status of responses to participants (Step 219 of FIG. 2) and request that each participant provide a response to support or reject the proposed venue. (Step 220 of FIG. 2.)

The response from each participant can take on one of many forms including a vote to support, reject or abstain on the task. (Step 222 of FIG. 2.) The response of each participant would be stored in a database and could be made available to share with some or all of the participants based on the desires of the originator and/or respondent participants. (Step 219 of FIG. 2.) In addition to providing a response, the participant can also provide structured "context/color/perspective" on their response in one or more categories including but not limited to time, money and emotion. For example, in the "Select a Venue" task described above, a Participant 1 who may vote to reject the decision because of the cost of the venue can also provide a structured numerical or pictorial/icon representation in a pre-defined category of cost to provide context as to why they voted "no". In this way each other participant would know that Participant 1 rejected the venue because of cost. Similarly, other categories of "context/color/perspective" such as time and emotion can be used to provide additional data from each participant and can be used to provide context for the response provided by each participant in the group. (Step 215 of FIG. 2.) After the participants have completed their response, the decision is communicated to participants (Step 223 of FIG. 2) and the decision task is complete. The originator of the decision can elect to create a task which results from the decision (such as Task Venue with a Location Hawaii on Date Jan. 1, 3000), import the task into the group event timeline (Step 225 of FIG. 2) and set an alert to notify participants of any changes to the decision and associated task (Step 226 of FIG. 2).

As illustrated by FIG. 3, participant(s) in the group decision example would be notified that a group decision requires their input (Step 310 of FIG. 3), they would decide if they wanted to participate in the decision (Step 320 of FIG. 3), respond per the parameters defined for that decision (Step 330 of FIG. 3), provide any feedback on the decision in a structured or unstructured form (Step 340 of FIG. 3), identify if they want to be notified of status of other participant responses to decision and finally elect to vote for/against or veto the decision based on what their privileges enable them to do (Step 360 of FIG. 3). The system also supports a broad range of workflows for decisions.

FIG. 4 is an example of a potential workflow where a group decision is created including decisions that have interdependencies. In this model, a participant creates a group decision task (Step 410 of FIG. 4), defines the set of decisions and their flow (Step 420 of FIG. 4), defines their interdependencies using a logical construct such as Boolean logic (Step 430 of FIG. 4). Once this is done, the flow can follow the flow of FIG. 3 (Step 440 of FIG. 4).

Other features as illustrated by FIG. 5-7 include allowing for asynchronous interactive participation of users as described in FIG. 6. Once a decision has been initiated (Step 601 of FIG. 6) and the decision has been defined (Step 602 of FIG. 6), the user can initiate an interaction with the participants where feedback from the participants is used to modify the decision (Steps 607 and 609 of FIG. 6) before requesting a vote from the participants vote (Steps 603, 608 and 610 of FIG. 6) and depending on the vote, accept the decision and convert to another task in the event (Steps 605 and 606 of FIG. 6). At its core, the group orchestration engine facilitates individuals to efficiently interact to define and execute various elements of a group event such as making a decision, creating a plan for the event and/or executing the event. In one basic form, the system enables a user to define who (Step 710 of FIG. 7), define an action (group decision, group planning, group execution, etc.) or combination of actions (Step 720 of FIG. 7), define key parameters such as where and when (Step 730 and 740 of FIG. 7), intelligently manage interaction between participants (Step 740 of FIG. 7) and create/manage/execute a master plan and associated timeline for the event (Step 760 of FIG. 7).

In addition, the group event orchestration platform that enables structured, asynchronous (and/or synchronous) group interaction, enables a range of new models for groups to interact including:

1. Ability to define different roles of each participant. (Step 213 of FIG. 2)
2. Ability to create/manage workflow by incorporating logical (Boolean, if/then, etc.) operators to manage flows of information between participants. (Step 430 of FIG. 4)
3. Ability to incorporate gaming aspects such as rewards into the interaction between participants
4. Enable groups to interact in a hub and spoke model (1-many) (Step 210 of FIG. 2)
5. Enable groups to interact in a distributed network model (many-many interactions) (Step 210 of FIG. 2)
6. Ability to incorporate structured and unstructured communications between participants
7. Ability to provide automated updates and reminders based on state information, such as location, time, status to one or more of the group members where such information is automatically provided by the users device (such as GPS on mobile phone) or manually entered by a participant in response to a request by the event orchestration platform or originated by the participant. (Step 523 of FIG. 5)

8. Ability to define group type for each participant (planner, inner circle, vendor, guest, etc.) which can then be used by the group to rapidly include members of a common type to create a group for a communication, task, etc.

9. Ability to define roles/responsibilities for each participant (originator, responder, observer, etc.) (Step 213 of FIG. 2)

10. Ability to define rights/privileges for each participant (administrative, participant, observer, etc.) (Step 212 of FIG. 2)

11. Ability to track and report state information for each task/event. (Step 515 of FIG. 5)

12. Ability to set dependencies between any two tasks or set of tasks. (Step 519 of FIG. 5)

13. Ability to include automated work flow based on state information and pre-determined dependencies 14. Ability to automatically capture state information and report to designated recipients (Step 523 of FIG. 5)

15. Ability to create groups for events as simple as making a decision (such as where to have lunch) to planning a large wedding. (Step 210 of FIG. 2)

16. Ability to use the platform to make group decisions on one or more elements of the event or task such as cost, location, time, attendees, etc.

17. Ability to plan an event in a distributed manner where each participant has the ability to create a set of tasks necessary to execute a portion of the event 18. Ability to automate the execution of all or a sub-set of the attributes of the event such as location of participants, status of a task, communication of information to participants, reminders to participants (roles, timing, duration, etc.)

19. Ability to interface with existing hardware and software platforms. The group orchestration engine can be used as a stand-alone platform or it can be used in conjunction with existing platforms including but not limited to Microsoft Outlook, Apple Mail, Gmail, Salesforce, Linked In and Facebook. It is anticipated that an interface between the group orchestration engine and existing platforms could be used to facilitate data inflows to the group orchestration engine (such as contact information for participants) and reporting of data outflows from the group orchestration engine (such as alerts) for display in the users daily productivity application such as Microsoft Outlook.

20. Ability to capture data from a single event and/or multiple events over time, aggregation of the data, storage of the data in a database and using machine learning techniques to operate on the stored data to identify patterns of behavior for individuals, groups, service providers, locations, etc. and using the information to provide modifications to various elements of group event orchestration platform as well as to provide rating/reviews/best practices of participants/locations, etc. As an example, the proposed system would learn over time that User 1 is habitually late for their tasks and would both modify the reminders for User A to be more frequent and earlier. In addition, the system would be also able to provide an "on-time" rating for User 1 that could be made available to other participants whenever User A was included in an event.

Any user can use the group orchestration platform to create an event comprised of multiple tasks and multiple participants, share the even with participants, confirm various attributes of the event with the participants and manage the execution of the events (FIG. 5). A user can define the tasks that comprise the event (Step 511 of FIG. 5), define key parameters of the task (Steps 512, 513, 514, 515, 516, 517 of FIG. 5), define logical flow amongst tasks and interdependencies of tasks (Step 519 of FIG. 5), receive confirmation (Step 518 of FIG. 5) and feedback from participants (Step 520 of FIG. 5), finalize the plan (Step 521 of FIG. 5), initiate execution of the plan (Step 522 of FIG. 5) wherein the system automatically delivers reminders and notifications set by the user and/or requested by the participant, provide status updates as necessary (Step 524 and 525 of FIG. 5).

In some embodiments, the platform described above for asynchronous (and synchronous) structured group interaction would also provide the ability for groups to organize the interaction around common themes associated with the orchestration of an event including:

1. Learning phase where the group is sharing information common to a task or event and understanding what parameters need to be defined to execute the task. For example in the "Select a Venue" task, participants could share information about likes and dislikes as well as cost parameters, availability of certain venues and capacity of each venue.

2. Decision phase where the group is making decisions based on the information shared to define what tasks should be included and the core parameters of the task 3. Planning phase where group members would develop the plan for the event by defining the tasks for the event and how best to execute the event. This would include but not be limited to assigning responsibilities for each task to one or more specific participants, defining co-dependencies between tasks, defining the order of execution of the various tasks, defining task attributes such as starting time, duration and location.

4. Execution phase where group members would be able to automatically see state information of each task (started, completed, in-progress, delayed, etc.) as well as state information of the entire event based on information either manually provided by participants, automatically queried by the system or automatically determined based on information obtained from the participants' mobile device. The execution phase would also enable the group to automate certain tasks based on the state of any particular task such as payment to a participant once a task has been reported to be completed by one or more participants. In addition, the platform would also be able to provide automatic reminders and alerts to each participant and requests for information to each participant as needed to capture state information and execute the specific task/event in an efficient manner.

5. Post-event phase where the group is reviewing the results of the event and sharing information about the event as well as making decisions about any remaining tasks such as payment to participants.

Further elements of the Group Orchestration/Interaction Platform to support structured asynchronous (and/or synchronous) group interaction include:

II. Workflow

The concept of workflow enables the participants to control the flow of information amongst the participants of an event/task based on attributes such as role, time, etc. This workflow can be state and task driven and enables a participant to define how information for one or more tasks is shared with other participants. This is useful for planning and decision making as well as execution. As an example, if a task includes five participants (User A, User B, User C, User D and User E) and the task was created by User A and needs approval of all other participants but User B has veto rights, then User A can use the workflow feature to designate that the task should be shared with User B first and only flow to Users C, D and E if User B approves the task. (Step 210 of FIG. 4). The workflow can include:

(a) Boolean Logic

The workflow can support Boolean logic (AND, OR would be the most common). The negation operations (NOT, NOR, NAND) can also be used to define the workflow. An example of a Boolean logic workflow using the AND function would enable User A to require that User B AND User C confirm an action (decision, plan, location, etc.) before seeking confirmation of User C. If either User A and User B chose not to confirm/approve an action, User C would not receive a request to confirm the action (Step 430 of FIG. 4.)

(b) Barrier and Join

The workflow can have Barrier and Join operation (where multiple people get the request for decision and the system waits for all of them to decide before proceeding) is another type of operation supported by the platform. (Step 222 of FIG. 2.)

(c) Sequencing

The sequence operations—where the order in which information is distributed can be defined. This would enable a user to define workflow where decisions are made in a pre-defined serial order. (FIG. 5.)

(d) Time Sequencing/Expiration

The system enables workflow to be controlled by time. A User can use this feature to set deadlines for decisions as well as flow of decisions based on time. For example, User A could require that User B confirm an action by a certain time (deadline) before seeking confirmation from User C. In addition, User A could elect to have User B notified of an action at Time 1 and User C be notified of an action at Time 2. (Step 524 of FIG. 5.)

(e) Location/Presence

The system enables workflow to be controlled by the location of a user. For example, User A can request confirmation to an action based on the location of User B. If User B is not at a specific location, the system would not seek confirmation of an action. Decisions which can only be made by people at specific location or geo-fence are called Presence Decisions. (Step 216 of FIG. 2.)

(f) Backup/Delegation Management

The system enables any user to designate a backup/delegate for them. This enables a second user to respond to requests for actions and enables workflow to be maintained.

(g) Prioritization

The system enables prioritization of actions in the workflow. Users can assign an importance level to each action in the workflow so that each user can identify high priority items. As an example, one or more decisions can be assigned a high priority level to enable users to focus on key decisions before responding to lower priority decisions.

(h) Categories/Groups

The workflow allows user to organize actions into categories. Different categories can have different properties mentioned previously to help with the workflow.

(i) Veto Management

The workflow allows certain users to have veto rights. This enables certain people to have vetoes over specific actions, decisions or categories of decisions or workflows.

(j) Exception Handling

There is ability to designate a person or workflow to handle exceptions if group decision making raises an exception.

(k) Mobile—Multiple Devices

This system is designed to operate on all devices—mobile, tablet, desktop etc., so that people can work with any device as well as interact on the go.

(l) Present in all Media Types

The event orchestration platform and workflow are designed to interoperate and integrate with all media types including—video, email, SMS, browser, custom clients, etc.

(m) Responder

The platform and workflow can support structured and unstructured responses by users. Examples of potential responses are listed to below Opt Out Response (participant elects to opt out of response)
        Do Not Care
        OK with Group Decision
        Do Not want to be involved
    Modify Decision Response
        Ask Originator to Add/Eliminate Decision Maker
        Change Parameters of Decision
    Ask For More Information Response
        Request Information
        Provide more information
    Make Decision Response (n) Group Decision The platform and workflow can support a range of parameters/actions between the originator of a task and participants in the group to enable actions such as group decisions. Example parameters are shown below.

What is the decision?
    Type of Decision
        Yes/No
        $
    Location
    Attendees
    Date
    Time
    Who is involved in Decision?
    Type
        Role (Required, Optional, cc)
        Distribution
    What is timeframe for Decision?
        Type Response Period
    What is type of Decision?
        Type
        Unanimous
        Majority
    Veto Rights
    How is Decision Processed?
        Boolean Logic
        IF/Then
    Security Settings
    Group View
        Private
        Parameters
        Modifiable by Responders (o) Group Execution The platform and workflow can support a range of parameters/actions between the originator of a task and participants in the group to enable actions such as group execution. Example parameters for coordinating workflow between participants for group execution of one or more tasks are shown below.

Co-dependency between includes the following
    Order of Execution
    Time
    Resources
    Participants Location
Boolean Logic
Workflow parameters include:
State (Active, Complete, Late, Incomplete etc)
Owner of Task
Duration
Co-dependencies
Contact Info of owner/Responsible party
Multi-party confirmation of co-dependencies i.e., as responsible parties must be able to set co-dependencies with other responsible parties
Have closed loop communication/confirmation of co-dependencies
Automated alerts driven by state information
Automated alerts driven by Location/GPS info such as location info of responsible party relative to initiation of task
Boolean logic flow
if/then flow
Group info of tasks
Task priority Level—Critical, Important, NiceToHave, NotNecessary
Ability to have backup task if task/set of tasks are not completed by certain date/time or there is an inability to complete a task
Gamification of tasks/execution
Rewards for 1st to complete, complete under time, under budget etc.

(p) Group Communication

The group communication platform supports both manual and automated group communication to support planning and execution. The group communication supports both synchronous and asynchronous interaction for both hub and spoke and distributed network models. The platform and workflow can support a range of parameters/actions between the originator of a task and participants in the group to enable actions such as group communication. Example parameters are shown below:

Communication can be limited to group to prevent sharing outside group
Enable 1 to Many, Many to 1, Many to Many communication within a defined group (private social network concept)
Supports text, voice, media, email and all communication platforms on all devices
Can specify delivery schedule based on a trigger (events/action, calendar/time)
Supports all devices
Open loop vs. Closed loop
 Requires confirmation/Receipt
 No Confirmation required
Provides State information
 Open/received/not opened by recipient
Ability to set privacy of communication
Distribution list can be categorized
Required/optional/cc/Bcc
Ability to tag communication with customized labels for auto sorting Hence, the group orchestration engine provides a highly customizable and adaptable platform that:

Enables and automates group interaction/orchestration including group communication, group decision, group planning and group execution
Supports asynchronous and synchronous interaction between members of a group
Supports structured and unstructured data formats for both input and output
Intelligently automates the interaction of a group for planning, decisions and execution
Enables Big Data analytics and machine learning to identify patterns and attributes of participants and that can facilitate group/orchestration

III. Modular Architecture

There are many potential embodiments of the event orchestrator. Several embodiments are described below. Some embodiments include four basic actions/modules: CREATE, SHARE, CONFIRM and ASSIST. FIGS. 8, 9, and 10.

(a) CREATE Module

The CREATE module enables users in the group to define an event as a set of tasks (and subtasks) (Step 810 of FIG. 8). Each task is created with a set of parameters including but not limited to NAME (i.e. name of the task): WHO (i.e., participants for the task) (Step 911 of FIG. 9), WHAT (i.e. define the task to be performed) (Step 912 of FIG. 9), WHEN (i.e. what is the time and duration of the task) (Step 913 of FIG. 9) and WHERE (i.e., what is the location of the task) (Step 914 of FIG. 9). The CREATE module also enables the originator of the task to define a range of control parameters (which control the workflow for each module) for the SHARE module, CONFIRM module and ASSIST module. Tasks can be organized in a variety of different formats including all tasks at one level, parent tasks with multiple levels of sub-tasks, tasks grouped by originator with multiple originators, etc. In addition, the parameters for a task can be customized by the user to contain elements that are necessary to describe the task.

Multilevel Tasks or Sub-Tasks—FIG. 12: The proposed platform supports the concept of distributed groups of tasks at a single level/plane as well as nested sub-tasks for each task with an unlimited number of layers of nesting. Once an event with at least a single task has been created, any invited participant may create a task associated with the event but that task may be defined to be visible to the participants of that task or it can be defined to be visible to all participants in the event. Hence, you can create connected but separate groups of tasks. An originator of a task can also create tasks that are nested within a task. The nested tasks follows the same constructs as a parent task but for organizational and viewing purposes, the user can elect to hide nested tasks/subtasks. The user can also elect to use a filter to designate which tasks are to be viewed. The filter can include parameters such as user(s), location, time, etc.

Every event or task can be broken up into multiple subtasks. Each subtask or subevent can be broken up again into multiple subtasks or subevents. This can be recursive. This is what is called multi-level tasks or multi-level events. The system can treat each subtask as an individual task and have workflow as described before. Allowing grouping of tasks/events by level—allows the system to present different views of the data. For example in FIG. 12: Prepwork task includes S1 and S2. Views of Prepwork can include S1 and S2. Also Prepwork's owner can see on the timeline both S1 and S2. In View mode—there can be filters by ALL, by level, by participant, by owner/originator. There are multiple ways to customize the display of this information to make it more relevant to an individual depending on the role they play.

(b) SHARE Module

Once the tasks comprising the event are defined in the CREATE module, the SHARE software module (Step 820 of FIG. 8) utilizes the WHO information contained in the task to automatically share the selected information (Step 1022 of FIG. 10) to the participants defined in each task (Step 1021 of FIG. 10). Note that the flow/order of how and when (Step 1023 of FIG. 10) the information in each task is shared can be defined/controlled by a broad range of parameters including but not limited to type of role and Boolean logic. The originator of the task can also elect to turn off the SHARE function for any or all tasks. Tasks can also be associated with a priority level and the user can elect to use priority to control how and what tasks are shared with users. One of the key attributes of the system is that the SHARE function is automated by the group orchestration platform. Each user does not have to manually share the task and its details with other users. The system gives each user control of how and when and what tasks are shared with other users. All each user has to do is to configure the parameters of SHARE and the system automates the interaction with other users. For each task, SHARE state information is maintained by the system so that it can be used to inform various attributes of the event (Step 1133 of FIG. 11).

(c) CONFIRM Module

Once the tasks have been shared with the participants, the CONFIRM module (Step 830 of FIG. 8) would automatically require/enable each participant to confirm any or all of the parameters that defined the task (WHO, WHAT, WHEN, WHERE, etc.). Depending on the desire of the originator of the task, the confirmation could be defined as mandatory for closed-loop interaction or optional/not needed for open-loop interaction (Step 1131 of FIG. 11). Note that the flow/order of how a task is confirmed can be defined/controlled by a broad range of control parameters including but not limited to role of participant, linear distribution, parallel distribution or utilize Boolean logic. The originator of the task can also elect to turn off the CONFIRM function for any or all tasks. Confirmation can also be required to be completed in a defined period (Step 1132 of FIG. 11). Tasks can also be associated with a priority level and the user can elect to use priority to control how and what tasks are confirmed with users. One of the key attributes of the system is that the CONFIRM function is automated by the group orchestration platform. Each user does not have to manually confirm the task and its details with other users. The system gives each user control of how and when and what tasks are confirmed with other users. All each user has to do is to configure the parameters of CONFIRM and the system automates the interaction with other users. For each task, CONFIRM state information is maintained by the system so that it can be used to inform various attributes of the event (Step 1133 of FIG. 11).

(d) ASSIST Module

The ASSIST module (Step 840 of FIG. 8) intelligently automates the orchestration of the event and its component tasks by automating the various attributes of the event customized for each task and for each participant including but not limited to automated collection and reporting of state information to the appropriate participant for each task, automated delivery of customized reminders (text, email, voice, etc.) to participants of each task, automated status of location of participants, automated delivery of information that would affect the execution of the task such as weather and traffic customized for each participant, automated updates such as changes in task location and time. Note that the flow/order of how ASSIST for any specific task is performed can be defined/controlled by a broad range of parameters including but not limited to role of participant, linear distribution, parallel distribution or utilize Boolean logic. The originator of the task can also elect to turn off the ASSIST function for any or all tasks. Tasks can also be associated with a priority level and the user can elect to use priority level to control how ASSIST is coordinated for tasks. One of the key attributes of the system is that the ASSIST function is automated by the group orchestration platform. Each user does not have to manually coordinate orchestration of the task with other users. The system gives each user control of how and when and parameters should be involved in the ASSIST function for each task. All each user has to do is to configure the control parameters of ASSIST and the system automates the interaction with other users. The ASSIST function eliminates the manual effort typically required for coordinating the execution of one or more tasks. For each task, ASSIST state information is maintained by the system so that it can be used to inform various attributes of the event (Step 1133 of FIG. 11).

(e) Module Inputs and Outputs

For each exemplary CREATE, SHARE, CONFIRM and ASSIST module, there are a large potential set of inputs that can be defined by one or more of the participants that are automatically translated by the group orchestration engine into a range of outputs and actions. Note that the inputs and outputs defined below are not meant to be complete but rather serve as an example of parameters that drive the functionality of the asynchronous (and synchronous) structured group interaction and enable the automation of group orchestration.

CREATE Module I/O:

Example Inputs: WHO, WHAT, WHEN and WHERE, $, Logical flow (Boolean or other), role (Step 915 of FIG. 9), etc.

Figure 13A:
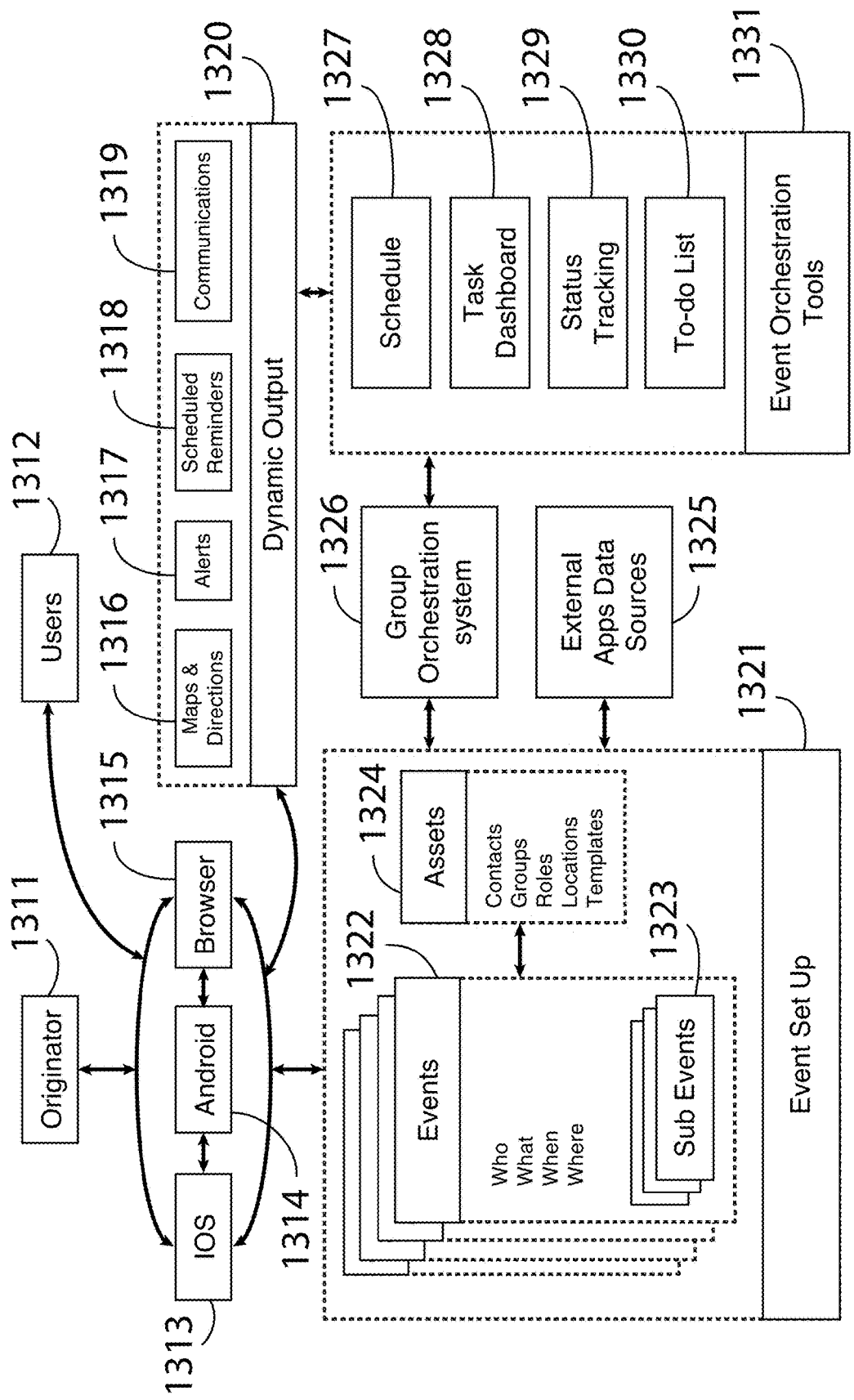

Example Outputs: Event/Group/Individual Timelines, e.g., Messages 1391, 1392, 1393 and 1394 of FIG. 13F, Event/Group/Individual views of Responsibilities/Tasks SHARE Module I/O:

Example Inputs: WHO, WHAT, WHEN, WHERE, Additional inputs include Logical flow (Boolean or other)

Example Outputs: Automated sharing, Event/Group/Individual view of state/status of Sharing for each task/event.

CONFIRM Module I/O:

Example Inputs: Confirmation Type (Required, not required), Confirmation period (time)

Example Outputs: State information (Confirmed, received but not confirmed, modify and confirm, etc.), Automated closed-loop confirmation, Event/Group/Individual view of state/status of Confirmation for each task/event.

ASSIST Module I/O:

Example Inputs: WHO, Type of Assist (Time, Geo, Weather, Status confirmation, etc.), Frequency of assist (1-time, repeat), Additional inputs include Logical flow (boolean or other)

Example Outputs: State Information by task/group/individual, automated reminders for one or more task parameters, automated updates of one or more task parameters, automated location status, automated weather and traffic information, automated status of each task, Event/Group/Individual view of state/status for each task/event.

It should also be noted that multiple workflows amongst the four modules (CREATE, SHARE, CONFIRM and ASSIST) are supported by the group orchestration platform including linear workflow (Steps 1341, 1342, 1343 and 1344 of FIG. 13B) non-linear workflow (Steps 1351, 1352, 1353 and 1354 of FIG. 13C). The platform is a dynamic group interaction engine that enables any participant(s) to manage the successful execution of a single task or a complex event composed of multiple tasks by automating many of the elements of planning and execution.

IV. Group Functionality

The exemplary embodiments described above can be used to orchestrate a group decision as described in greater detail below:

(a) Group Decision(s)

An exemplary simplified flow for a group decision (FIG. 7) can be created by identifying who the (WHO) is responsible for decision, defining the decision to be made (WHAT), define the location relevant to decision (WHERE) and when the outcome of decision needs to be made or put in action (WHEN). After WHO, WHAT, WHERE & WHEN have been determined, the system automatically notifies the WHO and requests a response from the WHO. After a decision has been made, it is automatically added as an item in the event.

This is also shown in FIG. 2 but we include the role as well of the person. WHO, WHAT, WHERE & WHEN can be considered as inputs for group decision. Additional inputs can include dollars (Cost, Spend, Budget etc.), roles and logical flow (Boolean or other).

One potential group decision workflow includes four basic steps—CREATE, SHARE, CONFIRM and ASSIST. In CREATE—we can create a decision as explained above in FIG. 7. Once a decision has been made—the output of that group decision is then shared with the group and other relevant people. For people who have roles and responsibilities for that task/event—the system then requests that they confirm the decision. Confirmations are of different types (required, not required) and can have a confirmation period (time). Once the confirmations are completed, during the actual group execution of task/event—the system will assist in its execution by sending reminders, smart notifications, geo or weather info/alerts, status info, allowing group communication, having backup plan, etc.

(b) Group Reminder(s)

Computer-based personal productivity tools such as Outlook from Microsoft Corporation and Google Calendar from Google have been introduced that include calendaring software with which a person can record events, meetings, tasks, etc., at specified dates and times, and receive reminders that pop up on their computer or smart phone screen at a specified time prior to the calendared event. However, such reminder mechanisms are limited in their usefulness for several reasons.

For example, both web and personal computer (PC) software-based approaches are generally limited to "self-reminders" and do not readily allow one person to communicate a reminder to another person or group of persons. In addition, reminders using web and PC software-based approaches are generally limited in the form of reminders that can be communicated; a pop-up window on the screen of the computer or other device running a copy or agent of the software. Further, web and PC software-based approaches do not include a mechanism to confirm that a reminder has been received in a timely manner, possibly acted upon, and repeated if not (possibly utilizing an alternative communication mechanism). Finally, PC software-based approaches are not designed to support group orchestration.

Most busy people experience the need to be reminded of many things during the course of a day, both in their personal as well as professional lives. As a result of the pace and fullness of modern life, this can include a wide range of appointments, obligations, events, meetings, tasks, deadlines and responsibilities. In addition, it is often desirable for one individual to be able to remind another individual of such things, and to do so in a flexible and reliable manner, and for critical matters, in a manner in which a confirmation occurs that the reminder has been received in a timely manner and possibly acted upon.

In another embodiment, the group orchestration engine can be described as a Group Reminder platform. As discussed above, one embodiment of the invention contemplated four basic modules: CREATE, SHARE, CONFIRM and ASSIST. While these modules are useful together, they can also be used in various combinations. As an example, CREATE and ASSIST can be used together to enable a reminder system that can be used to manage the execution of events between two or more participants, and as previously described, the group orchestration engine can interact with other existing platforms to enable new methods of orchestrating an activity. The Group Reminder embodiment described below leverages CREATE and ASSIST (a subset of the core functionality of the group orchestration engine described in a previous embodiment) in combination with an existing calendaring platform such as Microsoft Outlook to create an automated group reminder system for group orchestration.

In some embodiments of the group orchestrator, User 1 uses Microsoft Outlook on his personal computer and/or smart phone device and has a set of items entered into his Outlook calendar program. Using a plug-in developed for Outlook, and/or by visiting a web site or by using an application on a mobile device, User 1 can automatically synchronize his Outlook appointments with the reminder service. Thereafter, for each item in the Outlook calendar, the user can be prompted to choose (a) whether a reminder or reminders is desired, (b) when reminders should occur, (c) who should be reminded, (d) what the form or mechanism for the reminder should be and (e) whether confirmation of receipt of the reminder and/or confirmation of responsive action is desired.

As a specific simple example, User 1 may have recorded a calendar entry in Outlook that reflects a doctor's appointment he made for his 13 year old daughter. After synching his Outlook calendar with a website, he is able to request that a reminder be transmitted to his busy wife, via a phone call to any or all of her home, office or mobile phone numbers, scheduled to occur the day before the appointment, with a request that a confirmation that the reminder has been received be returned to him via email. For the phone call to his wife, he is able to pre-record a personal message which is to be used for the reminder.

In addition, he is able to have a text-message-based reminder sent to his daughter and to himself, scheduled to occur 1 hour before the appointment.

He can further request that a customized email be sent to his wife's personal assistant 30 minutes before the appointment, asking that he interrupt her with a personal message if she is preoccupied in a meeting and not attending to her computer or phone.

Finally, he is able to schedule that a message be sent to the doctor's office one hour prior to the doctor's appointment, requesting that he be emailed and his wife be promptly notified at her office if the doctor expects to be behind schedule by more than 20 minutes at the time of the scheduled appointment.

The reminder system according to the present embodiment then calls his wife 24 hours before the appointment using the prerecorded message and can request that she return a positive confirmation of receipt of the reminder by hitting a designated key. If she confirms as requested, the reminder system can generate an email that is forwarded to the user's email account. The reminder system can also support a confirmation of receipt of the reminder, accompanied by a negative response to the requested action, for example indicating that his wife has a schedule conflict and cannot participate at the doctor's appointment as requested. In such a case, the user could receive an alert that the appointment is in jeopardy.

If the appointment remains viable, one hour before the appointment, a text message appears on the user's mobile phone and his daughter's mobile phone with a reminder of the appointment, and a message is also received at the doctor's office seeking confirmation that the doctor is still on schedule. 30 minutes before the appointment, a customized email is sent to his wife's assistant asking him to interrupt and remind his wife of the appointment if necessary.

If his daughter wants to communicate to him where she is in regards to her status of arrival to the appointment, she can enable automated tracking and destination broadcasting so that he does not have to check in with her by getting her on the phone or getting a text response.

In another embodiment, User 2 has an elderly and perhaps distant parent, and would like to remind him to take his medication on a regular basis. User 2 does not regularly use PC-based calendaring software and her parent only has access to a land-based phone line. User 2 can use a group orchestration application to create and event for which a reminder or reminders is to be created.

For example, User 2 can enter the name or description of the event into the group orchestration system; "Mom's heart medicine" and can select particular criteria associated with the desired reminder; such as (a) the frequency of the event (1 reminder/week, every day, etc.) (b) the reminder mechanism(s) ("phone call"), (c) time or time range for the reminder ("9 am" or "between 9 and 10 am"), (d) whether a confirmation is required, (e) confirmation type ("press '*' on the phone dial pad"), (f) recipients for the confirmation (User 2 and User 2's sibling nearest to their parent).

User 2 can then prerecord a customized voice reminder and select a "failure to confirm" alert (e.g., she and her brother are to receive alert after 3 reminder messages are sent by the reminder system without receipt of confirmation from her parent) and target recipients for the failure to confirm alert (User 2, sibling and elderly parent's nurse or neighbor). User 2 can select appropriate communication mechanisms for receipt of the alert; e.g., phone call, email, test message, etc.

The reminder system is part of the automated group orchestration platform that according to this embodiment will then call the parent, e.g., at 9 am every day, using the message prerecorded by User 2, and requests a confirmation from the parent using the phone keypad or through a voice confirmation. Once the confirmation has been received, text-messages will be sent to the phones of User 2 and User 2's siblings. In the event that the parent fails to confirm after three repeated efforts, e.g., 15 minutes apart, an alert is communicated by the reminder system to User 2, his sibling and the nurse or neighbor, indicating that a confirmation has not been received for this particular reminder and that some follow-up inquiry may be appropriate.

Hence, the event orchestrator provides a user or users with the ability to input events into an electronic cloud-based group orchestration system through a web-based interface, smart phone application, text entry, telephonic voice message, telephonic voice recognition, and/or by automatically synching to their existing calendar application such as Outlook, Google Calendar, etc.

In some embodiments, the user is able, for each entered event in the group orchestration system, to select a reminder mechanism or mechanisms such as text, page, phone or email, and to select to which individual, individuals and/or organization the reminder is targeted.

In some embodiments, the user is able to specify the time at which a reminder is to be communicated, and the number and frequency of such reminder(s). Reminders can be scheduled to occur at precise points in time, or, perhaps to facilitate scaling of the system to large volumes of reminders and/or reflect differing levels of priority among reminders, within a span of time in which the reminder is to be communicated.

In some embodiments, reminders are communicated to one or more persons and, for each person that is reminded, a user can choose whether or not to request confirmation of receipt of the reminder through an action required of the person being reminded. Confirmations, upon being received by the system, may be communicated back to the user who entered the reminder, stored for later review or forwarded to a third person in a manner that may be selected by the user.

V. Group Travel Event Orchestration

In this embodiment as illustrated by FIG. 13, the group orchestration engine can be used to plan and execute a group trip. The organizer wants to plan a trip to Croatia and Italy for the month of August with a few other travelers. The organizer knows there are a lot of things to do, but is not yet sure of the order of events and the set of events that will be included in the final itinerary. This embodiment demonstrates how the group orchestration engine can be used to create a collaborative planning process and assist in the development of a plan and execution of the final planned itinerary.

Step 1: Event Creation

Using a mobile device (IOS or Android) or web browser (Steps 1313, 1314 and 1315 of FIG. 13A), User 1 (Step 1311 of FIG. 13A) initiates the planning process by creating a task entitled Family Vacation (Task Name) (Steps 1321 and 1322 of FIG. 13A), enters the list of participants and their contact information from her contact database (Task Who) (Step 1324 and 1325 of FIG. 13A), sets the travel duration from August 1 to August $28^{th}$ (Task When) and enters location as Europe (Task Where). User 1 creates a sub-task entitled Italy (Step 1323 of FIG. 13A) and another subtask entitled Croatia. For each task or sub-task User 1 enters Who, What, When and Where (as well as any other parameters necessary to describe the task).

Note that because User 1 has created subtasks Italy and Croatia, User 1 can vary the participants for each task enabling the members of the group to participate in all or part of the trip. User 1 now creates a subtask under Task Italy which is called Flight 1 and enters the Who, What, When and Where for Task Flight 1. If other users have different flight information, they can modify or add their own flight task with or without sharing it with the group. User 1 can also create other tasks under Task Italy to coordinate other elements of the trip including hotels, meals, museums, etc by defining Who, What, When and Where for each task. Note also that User 1 can designate if other users are allowed to modify the parameters of each task. If User 1 permits other users to modify the task and any of the parameters of a task are modified by another user (e.g. User 2), then the group orchestration engine can be used by User 2 to request that the participants of the task are ok with the newly modified parameters by using the SHARE and CONFIRM features of the platform.

Step 2: Event Sharing

Once User 1 has completed defining one or more tasks of the group event (Task Family Vacation), User 1 shares the event with the participants (Step 1312 of FIG. 13A) defined in each task. Note that User 1 can define how tasks are to be shared. As an example, User 1 may choose to share the task Family Vacation with all participants in parallel while electing to share Task Italy with only User 2 until User 2 has confirmed the details of Task Italy. Once User 2 has confirmed Task Italy, the group orchestration engine will share Task Italy with remaining participants of Task Italy. The order/flow and logic of how and when tasks are shared is defined by the originator of the task which in this case is User 1. Note also that User 1 can designate if other users are allowed to share or not share Task Italy with current or new participants.

Step 3: Event Confirmation:

User 1 can request that each participant confirm their role and responsibilities as defined in the individual task. As an example User 1 may require that all participants confirm their participation on the family vacation by confirming the task Family Vacation. The order/flow and logic of how and when tasks are confirmed is defined by the originator of the task which in this case is User 1.

Step 4: Event Planning

Once User 1 has created and shared Task Family Vacation, each user/participant can use the group orchestration engine to create other new tasks (which can be associated with other tasks or be stand-alone/independent tasks), share the new tasks as well as confirm tasks they or others have originated. This enables each individual to participate in the planning of the event and enables each participant to plan their own individual itinerary while being kept apprised of the different events being planned by others. As an example, suppose User 2 defines a task Pizza Dinner to take place at restaurant Rome on Date 1 at 6 pm and invites Users 1, 3, 4, 5 to participate. Suppose User 3 defines a task Pasta Dinner at restaurant Florence on Date 1 at 7 pm and invites users 1, 2, 4 to participate. In this example, the group orchestration engine would share the tasks with the appropriate Users and each user would be able to see the conflicts, decide what task they wanted to confirm or reject. This interactive methodology enables the event family vacation to be defined with as much or as little detail is desired by the participants. Some users may elect to use the platform to capture high level information only such as basic logistics (participants, flight details and dates of the event, etc.). Others may choose to use the platform to plan the details of every activity/event/task for each day of the event.

In the planning phase, participants can use the group orchestration engine to share potential activities (restaurants, museums, lodging, etc.). Participants can share information about the potential activities, and receive feedback on the activities. As the planning progresses, these activities can be confirmed into the plans, held/bookmarked as ideas that "may" happen if there is time, or designated as things that will not happened, but would like to be memorialized as options or for future trips. Data for an activity can be imported into the platform from a variety of sources: pre-populated templates, travel guides, Yelp and other review sites, or imported from previous events or friend's events (Step 1325 of FIG. 13A).

Step 5: Event Assist

The ASSIST function automates the orchestration of the event Family Vacation (Steps 1326 and 1331 of FIG. 13A) including but not limited to reminding each participant of the date of flight, reporting traffic information and weather that may effect travel time to the airport customized for each participant's location and flight times, automated delivery of customized reminders (text, email, voice, etc.) to participants of each task, automated status of location of participants, automated updates such as changes in task location and time. If the system identifies a participant as being late (either by geo-location technology or by a manual query of the user or self-reported by the user), the system can report the state of that participant to the other participants. The system also provides each user with an agenda dashboard of the day, week or complete vacation timeline that they can look at in various levels of detail (Steps 1327, 1328, 1329 and 1330 of FIG. 13A) at any time. Each user can create any view across any timeline for one or more parameters. For example User 1 can use the platform to view all activities for User 1 and User 3 in Location 1 on Day 4. User 2 can use the platform to view all activities for Location 2 for User 1. The ability to control/define what views are available to which users is also possible with the platform.

In the event that there are activities that were bookmarked in the planning phase, the user can easily navigate to these in their event timeline, or designate the system to provide reminders automatically when they are in the proximity of a bookmarked locations/activity. Location can be determined automatically through geo-location or self-reported by the participant. For example if the user noted four museums in Italy and one gelato spot, they will get an alert when they near the location, or near the time of where they should be in a location, and can navigate to directions or more details.

The method of communication can also be designated and varied by each user. User 1 can elect to interact with the platform using only text messages while User 2 can elect to use the web based app and mobile device for most interactions and use text for system generated reminders and alerts (Steps 1316, 1317, 1318, 1319 and 1320 of FIG. 13A). User 3 may prefer to have reminders automatically link to their calendar application such as Outlook and Google Calendar (Step 1325 of FIG. 13A). User 4 can elect to use the mobile app for all interactions with the platform. Any and all combinations of communication methods (email, text, voice, web application, PC based application, mobile device application, etc.) can be designated by each User. The capabilities of the ASSIST module are limitless and can be defined by one or more of the participants of the event to be as detailed or as simple as desired.

VI. Group Wedding Event Orchestration

In this embodiment, the group orchestration engine is used to plan and execute a wedding. The bride (User 1) wants to plan her destination wedding which will involve 200 guests, 20 vendors, 3 locations, 5 bridesmaids, 4 groomsmen. User 1 knows there are a lot of things to do, but is not yet sure of the order of events and the set of events that will be included in the final plan. This embodiment demonstrates selected elements of how the group orchestration engine can be used to create a collaborative planning process and assist in the execution of the final planned itinerary. Note that this embodiment is not intended to comprehensively describe the entire process of orchestrating a wedding.

Step 1: Event Creation

The bride (User 1) initiates the planning process by creating a task entitled My Wedding (Task Name) (Steps 1361, 1367, 1368 and 1363 of FIG. 13D), enters the list of participants and their contact information from her contact database (Task Who), sets the Wedding Date as Apr. 2, 2017 (Task When) and enters location as Punta Mita, Mexico. (Task Where). User 1 authorizes the system to enable her mother (Users 2) and her father (User 3) to have administrative privileges during the planning process to enable them to share responsibility in the planning process.

Figure 13D:
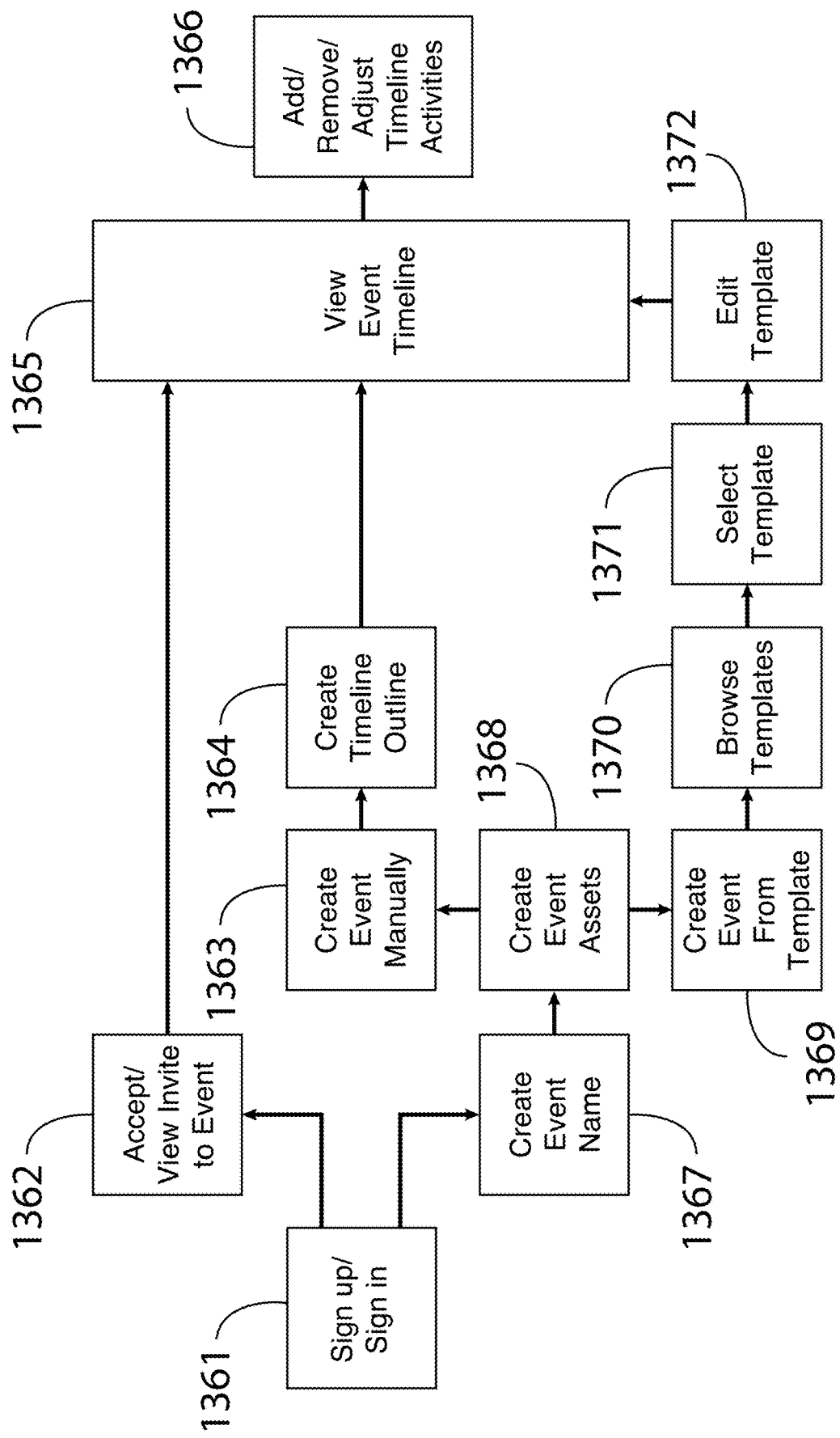
Figure 13E:
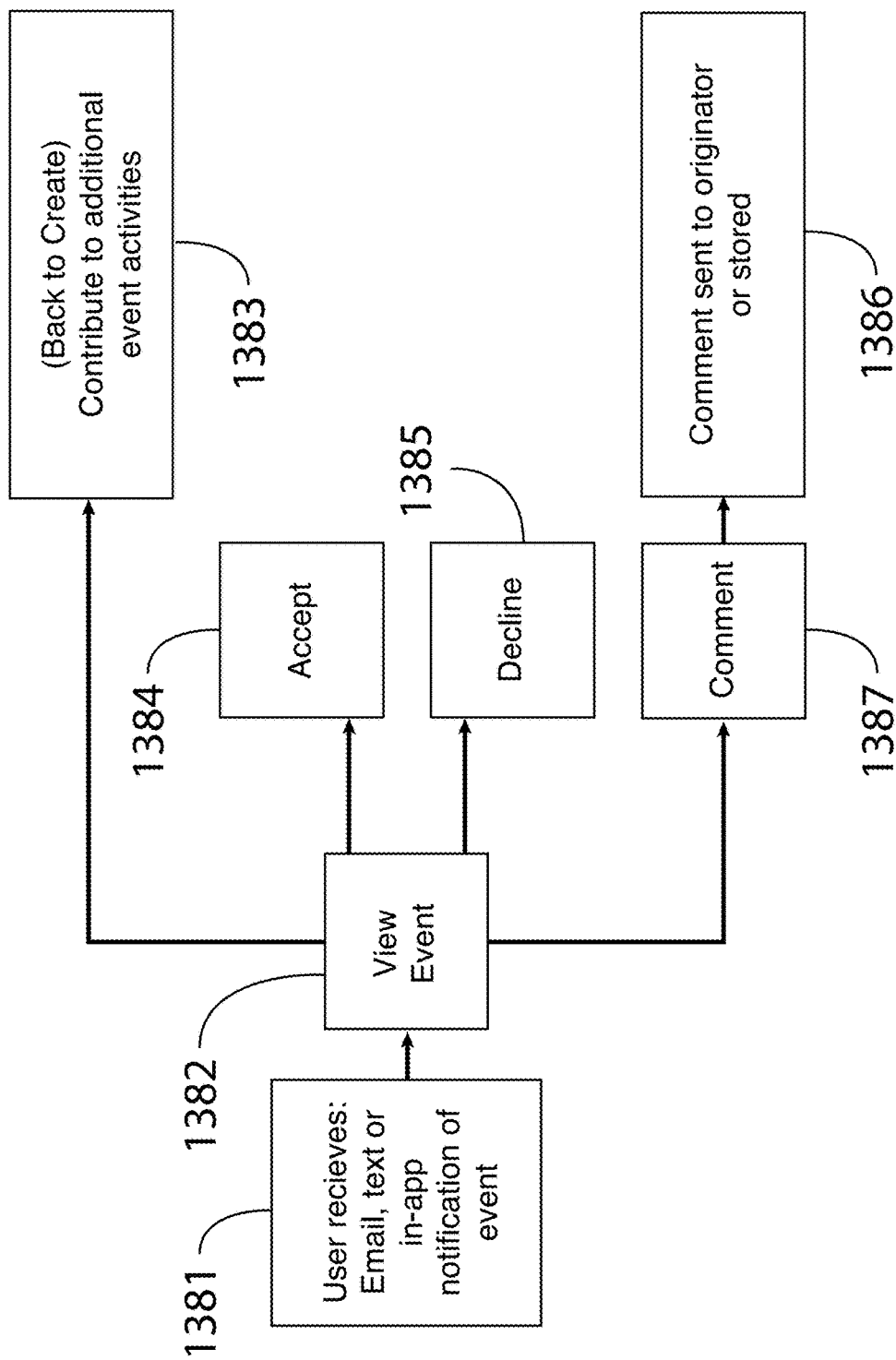
Figure 13F:
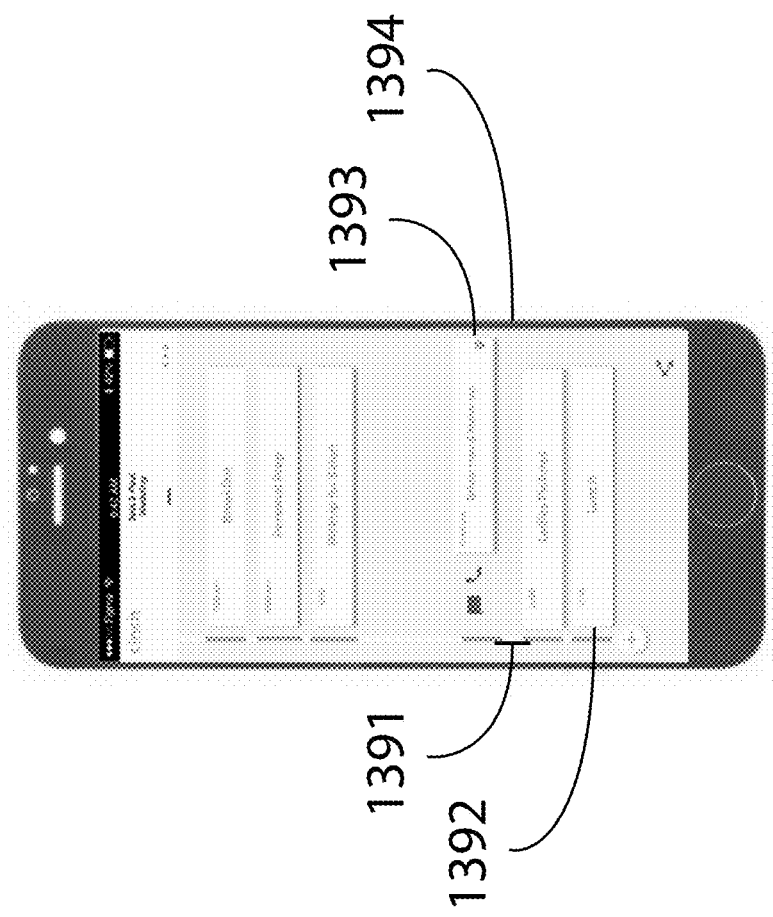

User 1 sets up the assets, such as contacts, roles, locations, and services to be used (Step 1368 of FIG. 13D). Contacts are entered or imported, and roles designated. A contact can be associated with a role, and in the case that a role is not yet filled, it can remain undefined.

As part of the planning phase, User 1 enters the contact information for the 5 bridesmaids and 4 groomsmen, and associates them with their respective roles of Bridesmaid and Groomsmen, as well as their role as Guest. Note that a user can have multiple roles (e.g. Bridesmaid and Guest). User 1 creates tasks and roles for each vendor that will be part of the event (such as: florist, limo driver, planner, hairdresser, caterer, bartender, custodian, baker, etc.). Because vendors have not yet been selected, User 1 does not associate contact information for vendor tasks. When the contact is entered for the florist, that user will be designated as the Florist (name and role), and be assigned to the group Vendor. Creating a Vendor group enables User 1 to associate all the vendors to any task by simply including the group Vendor as a participant to the task. User 1 creates/imports the contact information for the 200 guests, assigns the role Guest to each guest and adds them as participants to the Wedding Ceremony Task and Wedding Reception Task. At this point, User 1 selects not to share the tasks for Wedding Ceremony and Wedding Reception with the guests as the tasks are not yet complete.

User 1 creates 3 new tasks entitled Wedding Prep, Wedding Ceremony, and Wedding Reception which are nested into Task My Wedding. For each new task she enters Who, What, When, and Where. Note: Because User 1 has created subtasks Wedding Prep, Wedding Ceremony, and Wedding Reception, she can vary the participants for each task enabling the group to participate in all or parts of the Wedding Prep, Wedding Ceremony and Reception. User 1 invites the photographer, hairstylist, and bridesmaids to Wedding Prep.

User 1 then creates a nested task under Wedding Prep called Bridal Party Prep and enters the Who, What, When and Where for Task Bridal Party Prep. User 1 or other users can create and add detail to Bridal Party Prep to coordinate other elements of the day including hotels, meals and transportation. User 1 permits other users to modify the tasks so the group orchestration engine can be used by User 2 to add the details of the Bridal Party Prep, including attendees, location, and other information necessary for successful completion of the task by the attendees.

To help complete the creation of the desired wedding tasks, User 2 finds a group orchestration template for weddings that has pre-defined tasks with task names and associated roles. User 2 imports selected or all the tasks from the wedding template (Steps 1369, 1370, 1371 and 1372 of FIG. 13D). In this example, tasks such as Cocktail hour, Dinner, Speeches, Cake Cutting, and First Dance are imported. User 2 is able to edit the details, to customize these tasks, and nest them into the Wedding Reception Task. Users 1 and 3 are able to review and make adjustments. Each authorized user can view the timeline of the event and make any necessary adjustments (Steps 1365 and 1366 of FIG. 13D). Capabilities of the group orchestration platform are limitless and the CREATE parameters of each task can be defined by the originators of the task to be as detailed or as simple as desired Step 2: Event Sharing Once User 1 has completed defining the tasks for the event (My Wedding), User 1 may share the event with any or all of the participants defined in each task. User 1 can also define how tasks are to be shared. As an example, User 1 may choose to share the task My Wedding with all participants in parallel while electing to share the task Wedding Ceremony with only User 2 until User 2 has confirmed the details of task Wedding Ceremony. Once Wedding Ceremony is confirmed by the necessary users, the group orchestration engine will share task Wedding Ceremony with remaining participants of task Wedding Ceremony. The group orchestration engine allows users to collaborate during the planning process by enabling selected users to see any or all of the tasks, change, add to, or delete them before they are shared with the whole group. The order/flow and logic of how and when tasks are shared is defined by the originator of the task which in this case is User 1. Note also that User 1 can designate if other users are allowed to share or not share the task Wedding Ceremony with current or new participants. Sharing of the event with various users can be accomplished by a range of methods including email, text, in-app notification, etc. (Step 1381 of FIG. 13E). Users can elect to add tasks, modify tasks, comment on tasks once the event has been shared based on the privileges that have been assigned to them (Steps 1382, 1383, 1384, 1385, 1386 and 1387 of FIG. 13E). Any user can use the platform to create and manage the execution of events that are associated with My Wedding. Vendor Florist uses the platform to create tasks necessary to coordinate the execution of flowers for the reception by creating a task named Florist Reception with sub-tasks Flower Pickup and Flower Arrangement. For each task, the vendor Florist defines the key parameters (WHO, WHAT, WHEN, WHERE, etc.). This enables each Vendor to coordinate their staff and resources to ensure successful orchestration of their portion of the event My Wedding. Capabilities of the group orchestration platform are limitless and the SHARE parameters of each task can be defined by the originators of the task to be as detailed or as simple as desired.

Step 3: Event Confirmation

User 1 can request that each participant (Guests, Vendors, Bridesmaids, etc.) confirm their role and responsibilities as defined in the individual tasks. For the event MyWedding, User 1 requires that all vendors confirm their participation in the event MyWedding by either simply confirming or declining the task, commenting on the task and/or adding further detail to the task. The order/flow and logic of how and when tasks are confirmed is defined by the originator of the task unless the originator enables other users to manage the workflow for confirmation. Similarly, all users who have created tasks for the event can manage confirmation of their tasks. Florist uses the platform to make sure that their staff is confirmed for the event. User 1 also uses the platform to confirm which guests are attending and what their food preference is for the wedding. Capabilities of the group orchestration platform are limitless and the CONFIRM parameters of each task can be defined by the originators of the task to be as detailed or as simple as desired.

Step 4: Event Assist

The ASSIST function automates the orchestration of the event MyWedding; including but not limited to: providing schedule and location based reminders for each participant so they are aware of each task that involves them, reminding each participant of their commitments before the event, providing easy closed-loop feedback to the reminders, reporting traffic information and weather that may affect travel time or other task activities, automated delivery of pre-planned reminders or communication (text, email, voice, etc.) to participants of each task, automated status of location of participants, automated updates such as changes in task location and time, easy visibility into the status of other participants, providing the ability for task participants to communicate with each other in a planned or ad-hoc fashion.

ASSIST ensures that the vendors and all users get reminder notices prior to the wedding of their final confirmed duties and schedule. In the morning, vendors get a notice indicating when they should be leaving to account for traffic or changing conditions. They are able to confirm they are enroute, or indicate any changes proactively as a response to the notification. Similarly, vendors' staff gets reminders for tasks that the vendor has created for the event and for which they are a participant. Authorized users can view the status of tasks and identify which tasks are at risk, running late, or on-time, and adjust accordingly. The Caterer is able to share the wedding catering plan easily with their staff, and monitor their progress even if the caterer is not in the same location as them. The Photographer is able to use the group orchestration engine to text reminders to the participants required for the wedding party pictures about location and time so that the photographer can focus on taking great pictures instead of chasing down the people to photograph. If the father of the bride is busy chatting with his family, he can easily be contacted with an automated or ad-hoc call, text or notice from the group orchestration engine and he can make his way to the photographer without causing delays. During the ceremony, the group orchestration engine can be set to be on silent, as to not disrupt the event. Guests are reminded of wedding details (dress requirement, timings, location, etc.) on the day of the wedding so they do not have to search for emails and or paper invitations. Authorized users can use ASSIST to notify guests of changes in plans and updates (e.g. bride is delayed, reception being moved indoors due to weather, etc) as the wedding day progresses. Capabilities of the group orchestration platform are limitless and the ASSIST parameters of each task can be defined by the originators of the task to be as detailed or as simple as desired.

VII. Modifications and Additional Embodiments

Variations and permutations of the above described embodiments are contemplated with the scope of the present invention. As discussed above, the group orchestration engine ensures that the right people are in the right place at the right time doing the right thing. The ASSIST feature provides assistance for every person and every task. Event assistance can be personalized for each user to begin hours to days before the event commences.

Referring also to the exemplary screenshots of FIGS. 14, 15A-B and 16A, users are able to look at their personalized schedule for the event, which can be customized to display the events they want to see. The group orchestration engine supports tasks, sub-tasks and nesting of tasks where specific attributes of the task can be displayed by the user, e.g., Blocks 1510, 1520 and 1530 of FIG. 15A. Task nesting permits the user to view the tasks at various levels, for the desired amount of detail.

Figure 14:
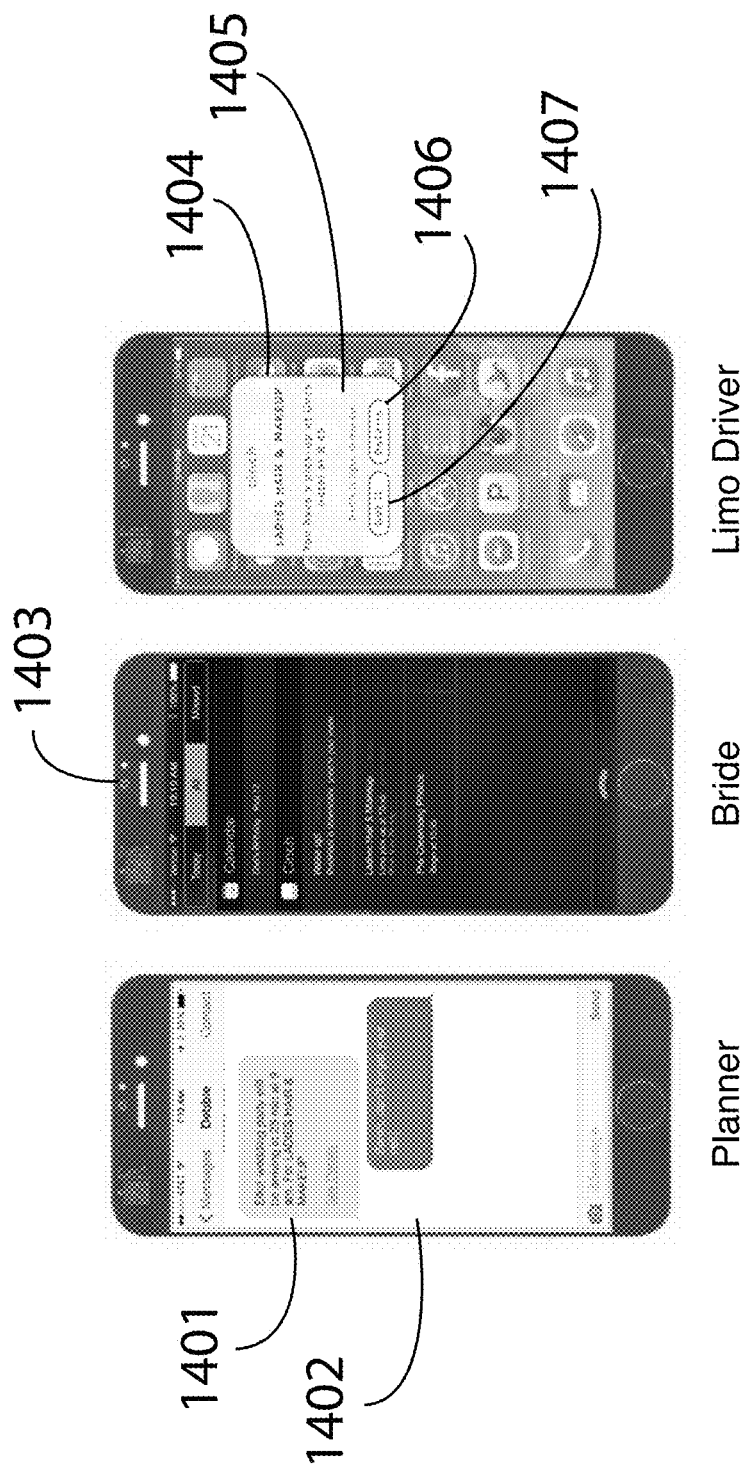
Figure 15A:
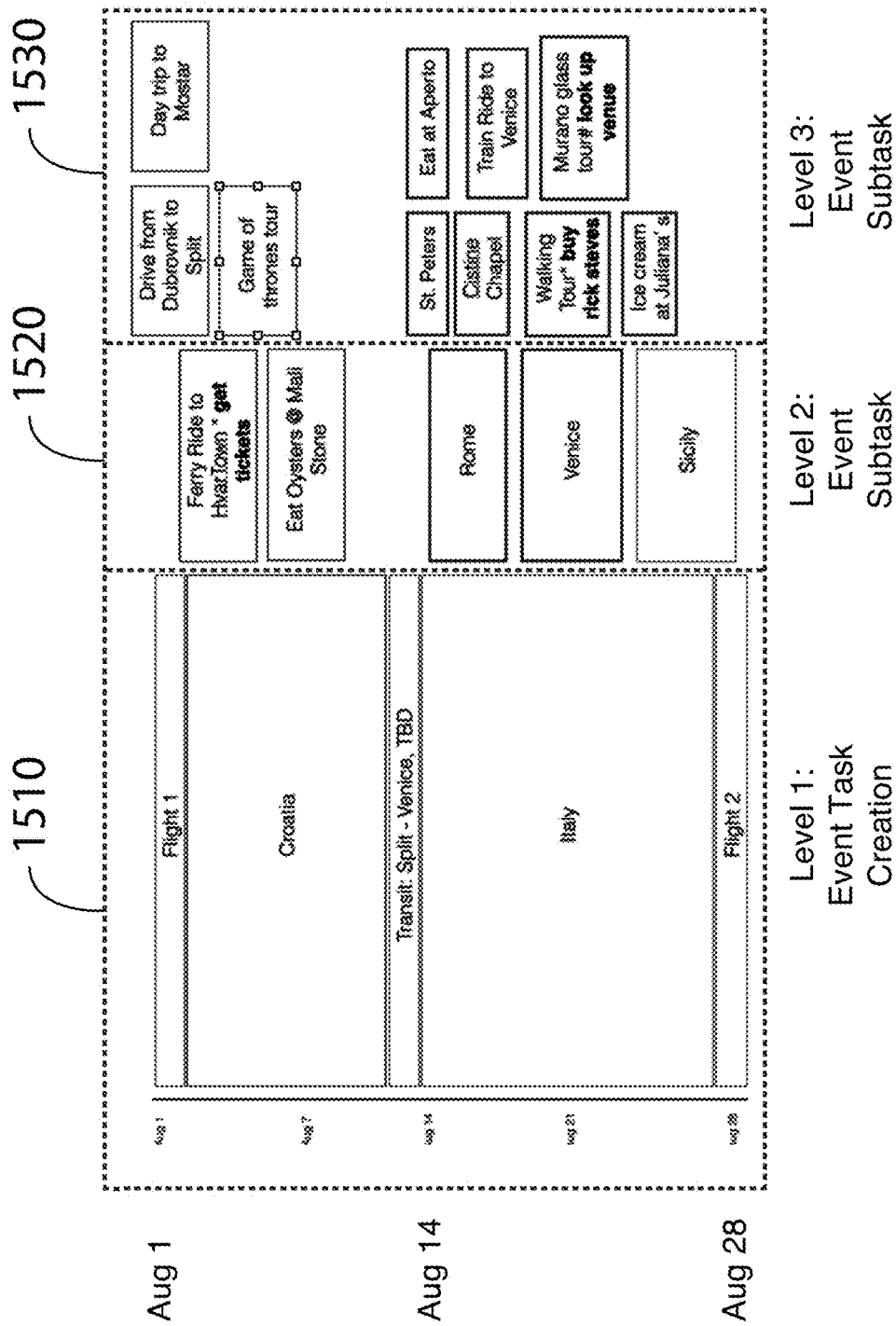

As shown in FIG. 14, the event orchestrator automatically and intelligently prompt the user with reminders, e.g., Messages 1401, 1402, 1403, 1404, 1405, based on a range of parameters including time, location, travel time, role, and current status. The user can confirm their on-time status (e.g., Icon 1407, or indicate if they have run into a delay. Other participants can use ASSIST to share the status of activities for the event, or use the ASSIST feature to quickly communicate (voice, text and/or email, etc.) with others on the same task or different task, e.g., Message 1393, to manage issues or changes.

Figure 16A:
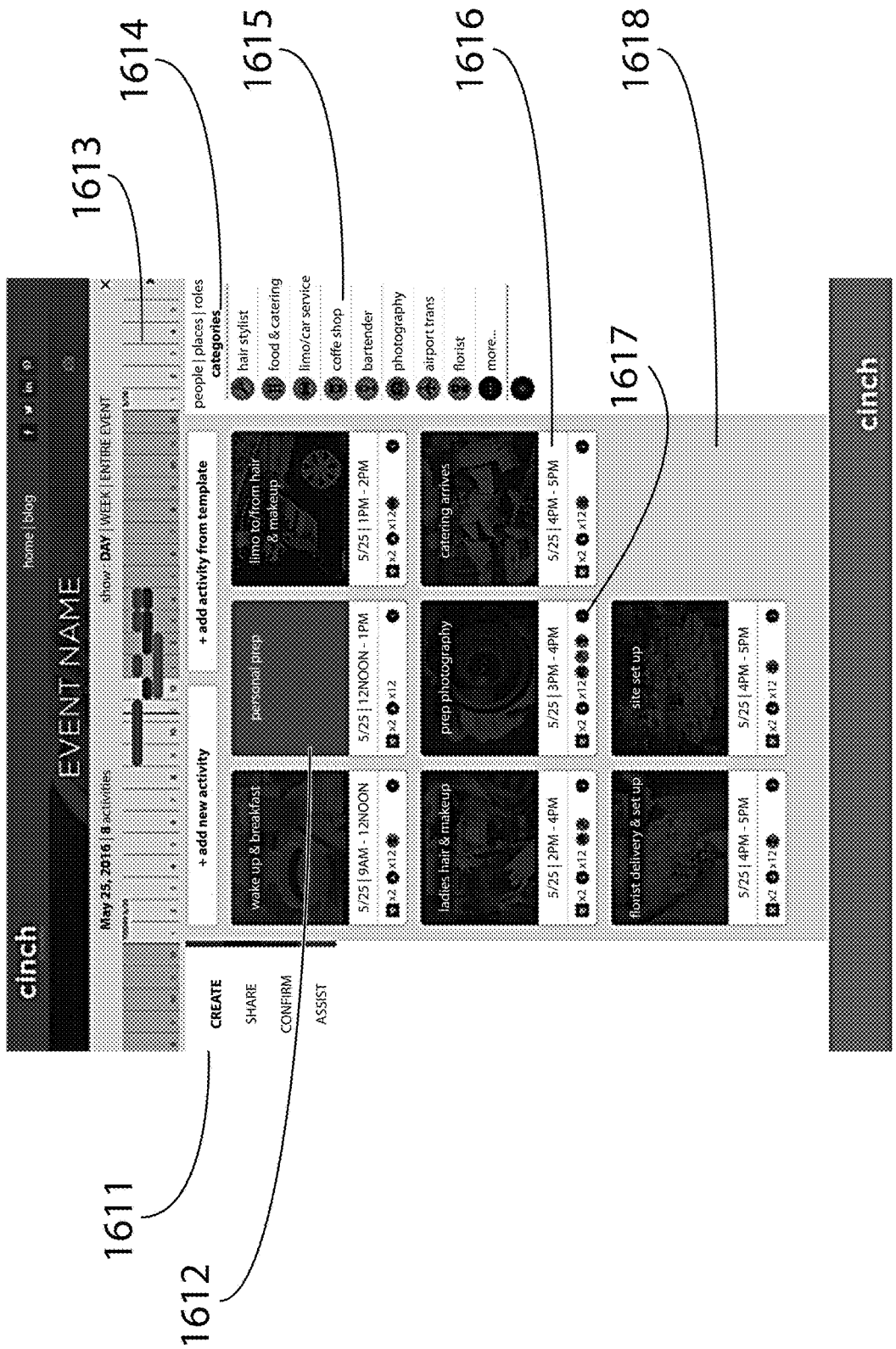

Further, the group orchestration engine supports event creation and planning of tasks from a list of activities or from a visual arrangement such as a set of "tiles", e.g., Tile 1617 of FIG. 16A, which display the activities and tasks for the event. Assets (structured information for people, places, location, roles etc.) required to populate the WHO, WHAT, WHEN and WHERE data fields can be imported from third party data sources and stored as assets (see Icons 1614 and 1615 of FIG. 16A). When assets are pulled into the event, they are displayed for easy visual review (see Icon 1617 of FIG. 16A). The "tile" format is also useful for users in the planning phase as it enables users to refine and finalize tasks as they progress through the planning cycle. The tasks can remain saved in the "sandbox" in order to keep them visible and editable before they are finalized (see Block 1618 of FIG. 16A). The user can add tasks, personalize a template (see Tile 1612 of FIG. 16A), or import tasks and ideas from their own past events or from their social network. Once the high level activities are established, nested sub tasks can be created, users can add detail to timelines (exact begin/end times, etc.) by typing or drag and drop, users can add detail to each task/sub task that has been created, users are able to drag and drop smaller events from sandbox onto a timeline, e.g., exemplary Tool Bar 1613 and users are able to drop tasks into other tasks to form a nested schedule. For example, the Dinner task is a part of the Wedding Reception task; therefore a user can drop the Dinner task into the Wedding Reception task and automatically associate the Dinner task as a sub-task of the Wedding Reception task.

FIGS. 16B-16E are exemplary flow diagrams illustrating event creating workflow of some event orchestrating embodiments useful for, e.g., orchestrating a wedding.

In this example, the user is planning an engagement lunch and wedding reception, both events will further be referred to as Wedding. The event orchestrator enables the user to create event(s), and also share, confirm and provide assistance to other participant(s), as described in detail above and illustrated by steps 1341, 1342, 1343, 1344 of FIG. 13B.

Referring now to FIG. 16B, an Event Creation 1621 can occur as follows:

1. Name of the event: (ie: An and Sei's engagement)
2. Date of the event: Oct. 22, 2016
3. Duration of the event: 10 am-3 pm
4. General location of the event: Napa Valley, Calif.
5. Type of Event: Wedding Within Event Creation 1621, three categories of information can be gathered, the order in which the information is gathered is not fixed, the user decides. The subsets of information need are: Event Profile 1622, Event Assets 1623 and Event Outline 1624.

FIG. 16C illustrates an exemplary workflow of Event Profile 1622 in greater detail wherein the user is able to define the following information:

Name of the event: (i.e.: An and Sei's Engagement)
Date of the event: Oct. 22, 2016
Duration of the event: 10 am-3 pm
General location of the event: Napa Valley, Calif.
Type of Event: Wedding As shown in FIG. 16D illustrating Event Assets 1623, the user is able to define information including Exact Location and People by for example:
Defining the individuals or groups of people that will participate in the event
Attributing specific individuals to one or many groups
Selecting rights/privileges for each individual or role
Add/Importing Contact information for each specific individual One such example of Event Asset 1623 is as follows:
Exact Location:
Engagement Lunch: Auberge du Soleil, 180 Rutherford Hill Road, Napa Valley, Calif. 94573
Wedding Reception: 1400 Penguin Lane, South Pole, Antarctica
People:
Wedding coordinator
Bridesmaids
Groomsmen
Family
Vendors
Guests
Defining the individuals or groups of people that will be a part of the event
Wedding coordinator:
Susan and Jill
Right/Privileges: full access to information, mirror the primary user's
Import contact information via iPhone:

In FIG. 16E, Event Outline 1624 show an exemplary view of the wedding and surrounding events, including week or days leading up to the event. The user has ultimate control to what level of detail (minute/day/week) they want to view the outline. Every wedding has smaller sub events that take place during the wedding day. There are four parts to every sub event that need be included in order for the platform to perform in Event Assist mode.
Who: The people involved in each activity
What: Title of the Event
When: Start and end time of each event
Where: Exact location of the event An example of a sub-event follows:
Who: Bride, Bridesmaids, Hairstylist
What: Hair and Make up Prep for Bride and Bridesmaids
When: 10 am, Saturday, Sep. 21, 2017 to 2 pm, Saturday, Sep. 21, 2017
Where: Cordevalle Spa, 24 Iceberg Street, South Pole, Antarctica Many other modifications and additions are also possible. For example, a wedding event orchestrator can be modified to facilitate/promote celebrity weddings by automatically coupling to social media websites, such as Tweeter, Instagram, Snapchat, Facebook and YouTube, to provide fans with contemporaneous press releases, tweets and/or video feeds covering the preparation and/or the wedding ceremony and reception.

In sum, the Event Orchestration Platform enables and automates group interaction/orchestration and supports asynchronous and synchronous interaction between members of the group. The Platform can be implemented using structured and unstructured data formats. Such a platform intelligently automates the interaction of a group for planning, decisions and execution. Embodiments utilizing Big Data Platforms that enable machine learning to identify patterns and attributes that can facilitate group/orchestration are also contemplated in accordance with the present invention.

Such an Event Orchestration Platform provides the ability to:
orchestrate the execution of an event which can be a decision or activity
design and automate communication workflow between participants of a group event using a variety of constructs
support structured and unstructured data flows
intelligently generate automates reminders and status updates to participants
support structured asynchronous and synchronous interaction between participants
create closed loop interaction as well as open loop interaction
enable participant(s) to create a sub-event with the same features/parameters as the main event
enabling machine learning to mine data to drive intelligence engine for managing assist Advantages of the present invention include the ability to reliably, provide, in both realtime non-realtime, users, such as, organizers, service providers (e.g., caterers and videographers), participants (e.g., family and clergy), guests, witnesses, press, etc., with the ability to constructively, effectively and efficiently interact to ensure the success of events. Advantages of the event orchestrator also include the ability to generate, send and/or receive timely instructions and reminders, and to track the progression and completion of task(s) associated with the user(s).

While this invention has been described in terms of several preferred embodiments, there are alterations, modifications, permutations, and substitute equivalents, which fall within the scope of this invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. In an event orchestrator, a computerized method for orchestrating events having a plurality of tasks, useful in association with a plurality of participants, the orchestration of at least one event comprising:
using machine learning to identify patterns and attributes of at least two participants that facilitates the orchestration of the at least one event, and wherein at least one of the at least two participants is grouped into at least one group type, and wherein the at least one group type is assigned at least one of a group right and a group privilege;

defining at least one task for the at least one event;

associating the at least one of the at least two participants with the at least one task, wherein at least one task association is created between the at least one of the at least two participants and the at least one task, and wherein the at least one task association includes at least one of an action item, an approval, an opinion, a veto, a payment, a decision, a communication, a coordination, a commitment, an agreement and any other associations, and wherein the at least one task association includes the at least one of the group right or the group privilege;

automatically generating a plurality of interactions between the at least two participants including at least one of a notification, a communication, and a reminder via email, text or in-app messaging for the at least one of the at least two participants, wherein the at least one of the notification, the communication, and the reminder is related to the at least one task association; wherein the plurality of interactions between the at least two participants include both synchronous and asynchronous interactions, wherein the plurality of interactions include both manual and automated interactions, wherein the interactions includes structured and unstructured communications between the at least two participants thereby enabling the at least one group type to organize the plurality of interactions around common themes associated with the orchestration of the at least one event;

modifying the at least one of the notification, the communication, and the reminder in response to the machine learning identified patterns and attributes;

transmitting the at least one of the notification, the communication, and the reminder to the at least one of the at least two participants over a computer network in real time, such that the at least one of the at least two participants has access to status of the at least one task;

tracking progress of the at least one task;

confirming completion of the at least one task with the at least one of the at least two participants; and wherein the orchestration of the at least one event includes a plurality of Phases including:
- a Learning Phase wherein the at least two participants of the at least one group type share information common to the at least one task including an understanding of parameters that need to be defined to execute the at least one task;
- a Decision and Planning Phase wherein the at least two participants of the at least one group are making decisions based on the shared information to define which of the at least one task should be included and also define core parameters of the at least one task, wherein the at least two participants of the at least one group type plan the at least one event by defining each of the at least one task and how best to execute the at least one task, including assigning and defining roles and responsibilities for the at least one task to one or more of the at least two participants, defining task co-dependencies, defining an execution order of the at least one task, defining task attributes including starting time, duration and location;
- an Execution Phase wherein the at least two participants of the at least one group type are able to automatically see state information of each of the at least one task based on privileges defined in the Planning Phase, including started, completed, in-progress, delayed, as well as state information of the at least one event based on information either manually provided by the at least two participants, automatically queried by the event orchestrator or automatically determined based on information obtained from a mobile device of one of the at least two participants, and wherein the Execution Phase also enables the at least one group type to automate the at least one task based on the state information of any particular one of the at least one task including a participant payment once the at least one task has been reported to be completed by one or more of the at least two participants; and
- a Post-Event Phase wherein the at least one group type reviews event results and shares information about the at least one event as well as making decisions about any remaining one of the at least one task.

2. The method as recited in claim 1, further comprising creating a backup task association between a backup participant of the at least two participants with the at least one task association, and wherein if the at least one task association is stalled or delayed, then activating the backup participant.

3. The method as recited in claim 1, wherein the at least one task includes at least one of a group decision, a group reminder, a group logistic, a group communication, a group payment, a group approval, a group discussion, a group opinion, a group commitment, a group sharing, a group planning, a group execution generating at least one notification, and a communication or a reminder for the at least one of the at least two participants.

4. The method as recited in claim 1 wherein the at least one task is associated with at least one of unstructured data, meta-data and structured data.

5. The method as recited in claim 1 wherein completion confirmation of the at least one task is ordered, and wherein the completion confirmation order is defined by the at least one of the at least two participants using a Boolean logic construct.

6. The method as recited in claim 1 further comprising rewarding at least one of the at least two participants with an incentive upon completion confirmation of one of at least one task assigned to the at least one of the at least two participants.

7. The method as recited in claim 1 further comprising group reviewing of the at least one task and group decision making for any of the at least one task that remains uncompleted.

8. The method as recited in claim 1 wherein the patterns and attributes include at least one of participant location, task status, weather and traffic.

9. The method as recited in claim 1, further comprising creating a backup task association between the at least one task with a backup task, and wherein if the at least one task is stalled or delayed, then activating the backup task.

10. The method of claim 1 wherein the plurality of interactions between the at least two participants includes sharing and confirming the at least one task, and wherein execution of the at least one task is accomplished using machine learning to automate the plurality of interactions between the at least two participants.

11. The method of claim 1 wherein the plurality of interactions enables the at least two participants to creation of a subset of the at least one task that define the at least one event, define required participants, location and details of each of the at least one task.

12. The method of claim 1 wherein the modification of the at least one of the notification, the communication, and the reminder includes changing a frequency or a timing of the at least one of the notification, the communication, and the reminder sent to the at least one of the at least two participants based on an "on-time" rating of the at least one of the at least two participants.

13. The method of claim 1 wherein the shared information includes likes and dislikes, cost parameters, availability of venues and capacity of each venue.

14. The method as recited in claim 1, further comprising notifying the at least one of the at least two participants of a need for a decision based on the at least one of the group right or the group privilege, inviting the at least one of the at least two participants to provide a required response for the decision, and processing the required response from the at least one of the at least two participants based on the at least one of the group right or the group privilege of the at least one of the at least two participants.

15. The method of claim 14 wherein the event orchestrator utilizes Boolean logic to determine an order in which information associated with the at least one task is communicated amongst the at least one of the at least two participants associated with the at least one task.

16. The method as recited in claim 1, wherein the communication, notification and reminder are automatically generated using state information representing at least one of a location of a group, a date, a time, a duration, a response to a query, a group generated state information and a status of a task.

17. The method as recited in claim 16, wherein the state information is stored in a database and communicated automatically to at least one designated recipient, and wherein the at least one designated recipient includes at least one of a group, a collection of groups, an individual in a group and a set of individuals across a group with common roles or privileges.

18. The method as recited in claim 16, wherein the state information is determined using a mobile device of one of the at least two participants and the state information is used as an input to the event orchestrator to determine a task state or an event state, and wherein the event orchestrator uses rules-based algorithms to determine an action desired to be taken by the one of the at least two participants and communicates the action desired to the one of the at least two participants.

19. A computerized event orchestrator configured to orchestrate events having a plurality of tasks, useful in association with a plurality of participants, the event orchestrator comprising:
 a computerized events coordinator configured to:
  use machine learning to identify patterns and attributes of at least two participants that facilitates the orchestration of at least one event, and wherein at least one of the at least two participants is grouped into at least one group type, and wherein the at least one group type is assigned at least one of a group right and a group privilege;
  define at least one task for the at least one event;
  associate the at least one of the at least two participants with the at least one task, wherein at least one task association is created between the at least one of the at least two participants and the at least one task, and wherein the at least one task association includes at least one of an action item, an approval, an opinion, a veto, a payment and any other associations, and wherein the at least one task association includes the at least one of the group right or the group privilege;
  automatically generate a plurality of interactions between the at least two participants including at least one of a notification, a communication, and a reminder for the at least one of the at least two participants, wherein the at least one of the notification, the communication, and the reminder is related to the at least one task association, wherein the plurality of interactions between the at least two participants include both synchronous and asynchronous interactions, wherein the plurality of interactions include both manual and automated interactions, wherein the interactions includes structured and unstructured communications between the at least two participants thereby enabling the at least one group type to organize the plurality of interactions around common themes associated with the orchestration of the at least one event;
  modify the at least one of the notification, the communication, and the reminder in response to the machine learning identified patterns and attributes;
  track progress of the at least one task;
  confirm completion of the at least one task with the at least one of the at least two participants; and
  wherein the orchestration of the at least one event includes a plurality of Phases including:
   a Learning Phase wherein the at least two participants of the at least one group type share information common to the at least one task including an understanding of parameters that need to be defined to execute the at least one task;
   a Decision and Planning Phase wherein the at least two participants of the at least one group are making decisions based on the shared information to define which of the at least one task should be included and also define core parameters of the at least one task, wherein the at least two participants of the at least one group type plan the at least one event by defining each of the at least one task and how best to execute the at least one task, including assigning and defining roles and responsibilities for the at least one task to one or more of the at least two participants, defining task co-dependencies, defining an execution order of the at least one task, defining task attributes including starting time, duration and location;
   an Execution Phase wherein the at least two participants of the at least one group type are able to automatically see state information of each of the at least one task based on privileges defined in the Planning Phase, including started, completed, in-progress, delayed, as well as state information of the at least one event based on information either manually provided by the at least two participants, automatically queried by the event orchestrator or automatically determined based on information obtained from a mobile device of one of the at least two participants, and wherein the Execution Phase also enables the at least one group type to automate the at least one task based on the state information of any particular one of the at least one task including a participant payment once the at least one task has been reported to be completed by one or more of the at least two participants; and
   a Post-Event Phase wherein the at least one group type reviews event results and shares information about the at least one event as well as making decisions about any remaining one of the at least one task; and a computerized user interface configured to:
transmit the at least of the notification, the communication, and the reminder via email, text or in-app messaging to the at least one of the at least two participants over a computer network in real time, such that the at least one of the at least two participants has access to status of the at least one task; and provide completion confirmation of the at least one task to the at least one of the at least two participants over the computer network in real time.

20. The event orchestrator as recited in claim 19, wherein the events coordinator is further configured to define at least one dependency between the at least one task association of the at least one of the at least two participants.

21. The event orchestrator as recited in claim 19, wherein the events coordinator is further configured to define a plurality of group decision flow stages including creating an event/task, sharing the event/task, confirming the event or task and assisting during the event/tasks.

22. The event orchestrator as recited in claim 19, wherein the events coordinator is further configured to multilevel tasks/events by having each event or task be associated with multiple other events or tasks.

23. The event orchestrator as recited in claim 19, wherein the events coordinator is further configured to create an event or task and to define a plurality of group decision inputs including Who, What, Where and When.

24. The event orchestrator as recited in claim 19, wherein the at least one task includes at least one of a group decision, a group reminder, a group logistic, a group communication, a group payment, a group approval, a group discussion, a group opinion, a group commitment, a group sharing, a group planning, a group execution generating at least one notification, and a communication or a reminder for the at least one of the at least two participants.

25. The event orchestrator as recited in claim 19, wherein the events coordinator is further configured to:
define a start state of the at least one task and an end state of the task;
define a role or a privilege that each associated participant has and an action that is necessary for completing the at least one task;
share the necessary action of at least one task with each associated participant; and
manage execution of the at least one task from the start state to the end state of the at least one task.

26. The event orchestrator as recited in claim 19, wherein the communication, notification and reminder are automatically generated using state information representing at least one of a location of a group, a date, a time, a duration, a response to a query, a group generated state information and a status of a task.

27. The event orchestrator as recited in claim 26, wherein the state information is stored in a database and communicated automatically to at least one designated recipient, and wherein the at least one designated recipient includes at least one of a group, a collection of groups, an individual in a group and a set of individuals across a group with common roles or privileges.

* * * * *